US012544768B2

(12) United States Patent
Takagi

(10) Patent No.: US 12,544,768 B2
(45) Date of Patent: Feb. 10, 2026

(54) MAGNETIC SEPARATION DEVICE AND MAGNETIC SEPARATION METHOD

(71) Applicant: SEIKO EPSON CORPORATION, Tokyo (JP)

(72) Inventor: Fumio Takagi, Chino (JP)

(73) Assignee: SEIKO EPSON CORPORATION (JP)

( * ) Notice: Subject to any disclaimer, the term of this patent is extended or adjusted under 35 U.S.C. 154(b) by 0 days.

(21) Appl. No.: 18/617,855

(22) Filed: Mar. 27, 2024

(65) Prior Publication Data

US 2024/0326067 A1 Oct. 3, 2024

(30) Foreign Application Priority Data

Mar. 28, 2023 (JP) ................................ 2023-051109

(51) Int. Cl.
*B03C 1/12* (2006.01)

(52) U.S. Cl.
CPC ............ *B03C 1/12* (2013.01); *B03C 2201/18* (2013.01)

(58) Field of Classification Search
CPC ............ B03C 1/01; B03C 1/0332; B03C 1/12
USPC .......................................................... 209/219
See application file for complete search history.

(56) References Cited

U.S. PATENT DOCUMENTS 5,770,461 A * 6/1998 Sakazume ........ G01N 33/54326 436/526
10,961,491 B1 * 3/2021 Dai ........................ C12M 47/06
2020/0348322 A1 * 11/2020 Horak ................ C12N 15/1013

FOREIGN PATENT DOCUMENTS

JP 2004283728 A * 10/2004 .............. B03C 1/00
JP 2005-205367 A 8/2005
JP 2010-081915 A 4/2010
JP 2014-018692 A 2/2014

OTHER PUBLICATIONS

Tadashi; Matsunaga, "Magnetic Separator for Magnetic Particulate" (English Translation), Oct. 14, 2004, worldwide.espacenet.com (Year: 2004).*

* cited by examiner

*Primary Examiner* — Molly K Devine
(74) *Attorney, Agent, or Firm* — Harness, Dickey & Pierce, P.L.C.

(57) ABSTRACT

A magnetic separation device includes: a magnet provided at a position adjacent to a tubular accommodation portion extending along a first axis and having magnetization for applying magnetic field to the accommodation portion; a base configured to support the magnet; and a drive unit configured to change, when an axis orthogonal to the first axis is a second axis and an axis orthogonal to the second axis in a plane including the second axis is a third axis, a posture of the magnet between a first posture in which a direction of the magnetization faces a direction closer to the second axis than the third axis and a second posture in which the direction of the magnetization faces a direction closer to the third axis than the second axis.

9 Claims, 12 Drawing Sheets

MAGNETIC SEPARATION DEVICE AND MAGNETIC SEPARATION METHOD

The present application is based on, and claims priority from JP Application Serial Number 2023-051109, filed Mar. 28, 2023, the disclosure of which is hereby incorporated by reference herein in its entirety.

BACKGROUND

1. Technical Field

The present disclosure relates to a magnetic separation device and a magnetic separation method.

2. Related Art

In recent years, in diagnosis in the medical field and in the field of life science, there has been an increasing demand for testing biological substances. Among biological substance testing methods, a polymerase chain reaction (PCR) method is a method of extracting a nucleic acid such as deoxyribonucleic acid (DNA) and ribonucleic acid (RNA), and specifically amplifying and detecting the nucleic acid. In a process of testing such a biological substance, it is necessary to first extract a substance to be tested from a specimen. For the extraction of the biological substance, a magnetic separation method using magnetic beads is widely used. In the magnetic separation method, a biological substance is extracted by applying a magnetic field using magnetic beads having a function of binding the biological substance to be extracted. Specifically, the magnetic beads having the function of binding the substance to be tested on surfaces of the magnetic beads are dispersed in a dispersion medium, then the obtained dispersion liquid is attached to a magnetic field generation device such as a magnetic stand, and ON/OFF of magnetic field application is repeated a plurality of times. Accordingly, the substance to be tested is extracted. Since such a magnetic separation method is a method of separating and collecting magnetic beads by a magnetic force, a rapid separation operation can be performed.

The same magnetic separation method is used not only in the extraction performed by the PCR method but also in fields of protein purification, separation and extraction of exosomes and cells, or the like.

In the magnetic separation method, a magnetic stand is used. The magnetic stand has a function of holding a container and a function of applying a magnetic field to the container. For example, JP-A-2014-018692 discloses a magnetic stand including a base having a holding hole into which a container is inserted, and a permanent magnet provided on the base. In the magnetic stand, the permanent magnet is disposed such that an N pole faces a container side and an S pole faces an opposite side thereof.

JP-A-2014-018692 is an example of the related art.

SUMMARY

When a magnetic field is applied to a container containing magnetic beads, the magnetic beads in the container are arranged along a direction of the magnetic field. Therefore, when the permanent magnet is disposed as described in JP-A-2014-018692, the magnetic beads are arranged in a needle shape along a radial direction of the container. Such a phenomenon in which the magnetic beads are arranged in the needle shape is also referred to as a "spike phenomenon". When the spike phenomenon occurs, a solution is likely to be held between the magnetic beads arranged in the needle shape. As a result, separability between the magnetic beads and the solution is reduced, and impurities are likely to be mixed into an extracted biological substance.

On the other hand, the occurrence of the spike phenomenon can be prevented by changing the arrangement of the permanent magnet described in JP-A-2014-018692. However, in this case, a magnetic field gradient generated in the container becomes small, and a time required for magnetic separation becomes long.

Therefore, it is a problem to implement a magnetic separation device that is excellent in both magnetic separation speed and separation efficiency between magnetic beads and a liquid.

A magnetic separation device according to an application example of the present disclosure includes:

- a magnet provided at a position adjacent to a tubular accommodation portion extending along a first axis and having magnetization for applying a magnetic field to the accommodation portion;
- a base configured to support the magnet; and
- a drive unit configured to change, when an axis orthogonal to the first axis is a second axis and an axis orthogonal to the second axis in a plane including the second axis is a third axis, a posture of the magnet between a first posture in which a direction of the magnetization faces a direction closer to the second axis than the third axis and a second posture in which the direction of the magnetization faces a direction closer to the third axis than the second axis.

A magnetic separation method according to an application example of the present disclosure includes:

- a magnetic separation step of separating, by applying a magnetic field to a tubular accommodation portion for accommodating magnetic beads and a liquid and fixing the magnetic beads to an inner wall of the accommodation portion, the magnetic beads and the liquid; and
- a liquid discharge step of discharging the liquid in a state in which the magnetic beads and the liquid are separated, in which
- when an axis along an extending direction of the accommodation portion is a first axis, an axis orthogonal to the first axis in a plane orthogonal to the first axis is a second axis, and an axis orthogonal to the second axis in the plane is a third axis,
- in the magnetic separation step, a magnetic field is applied at an angle closer to the second axis than the third axis, and
- in the liquid discharge step, a magnetic field is applied at an angle closer to the third axis than the second axis.

DESCRIPTION OF EMBODIMENTS

Hereinafter, preferred embodiments of a magnetic separation device and a magnetic separation method according to the present disclosure will be described in detail with reference to the accompanying drawings. In some drawings of the present application, three axes orthogonal to one another are set as an X-axis, a Y-axis, and a Z-axis. Each axis is indicated by an arrow, a tip end side is "plus", and a base end side is "minus". In the following description, for example, an "X-axis direction" includes both a plus direction and a minus direction of the X-axis. The same applies to a Y-axis direction and a Z-axis direction. In the following description, a plus side of the Z-axis may be referred to as "upper" and a minus side of the Z-axis may be referred to as "lower".

1. First Embodiment

First, a first embodiment will be described.

1.1. Magnetic Separation Device

Figure 1:
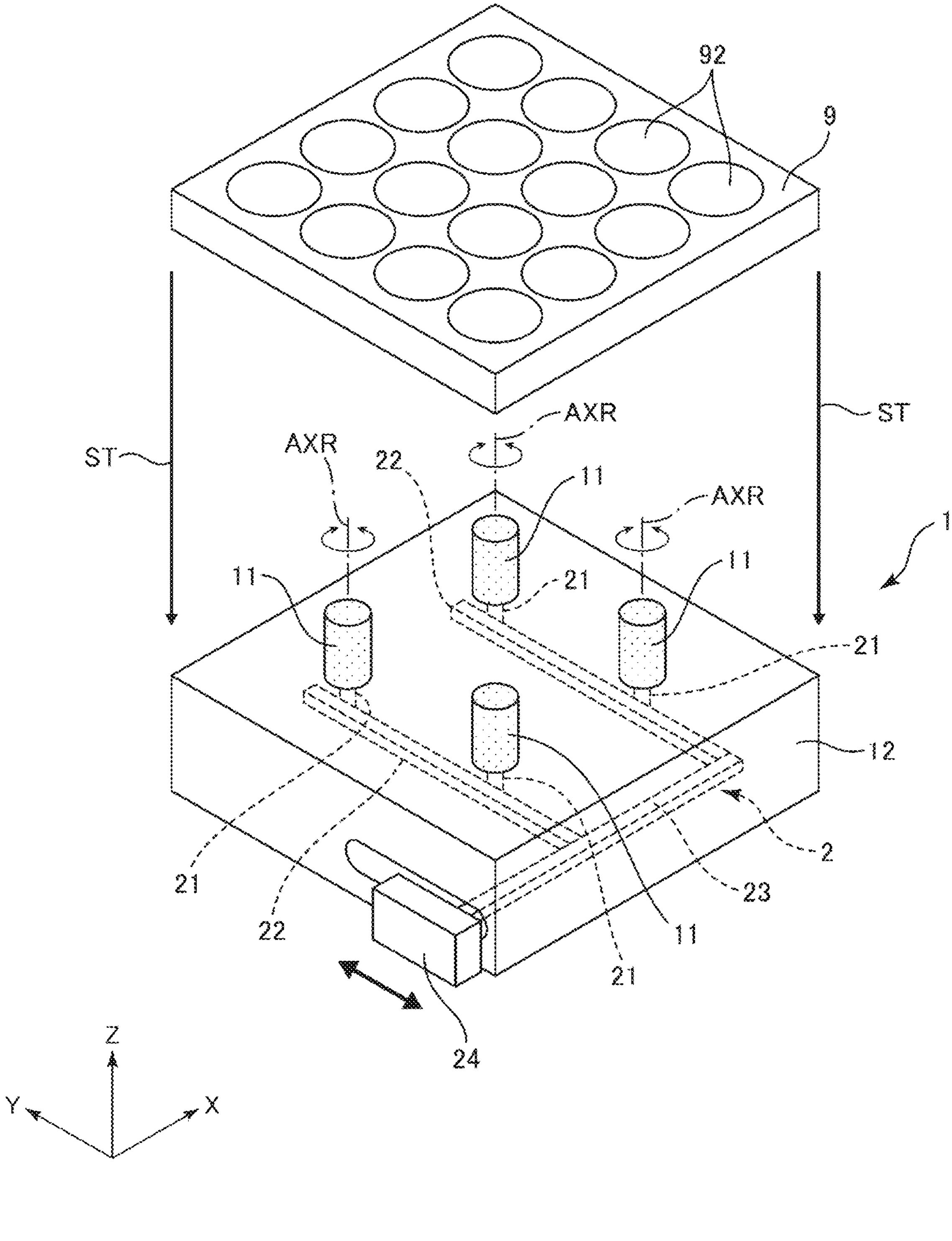
FIG. 1 is a perspective view showing an example of a magnetic separation device according to a first embodiment and a well plate used therein.
Figure 2:
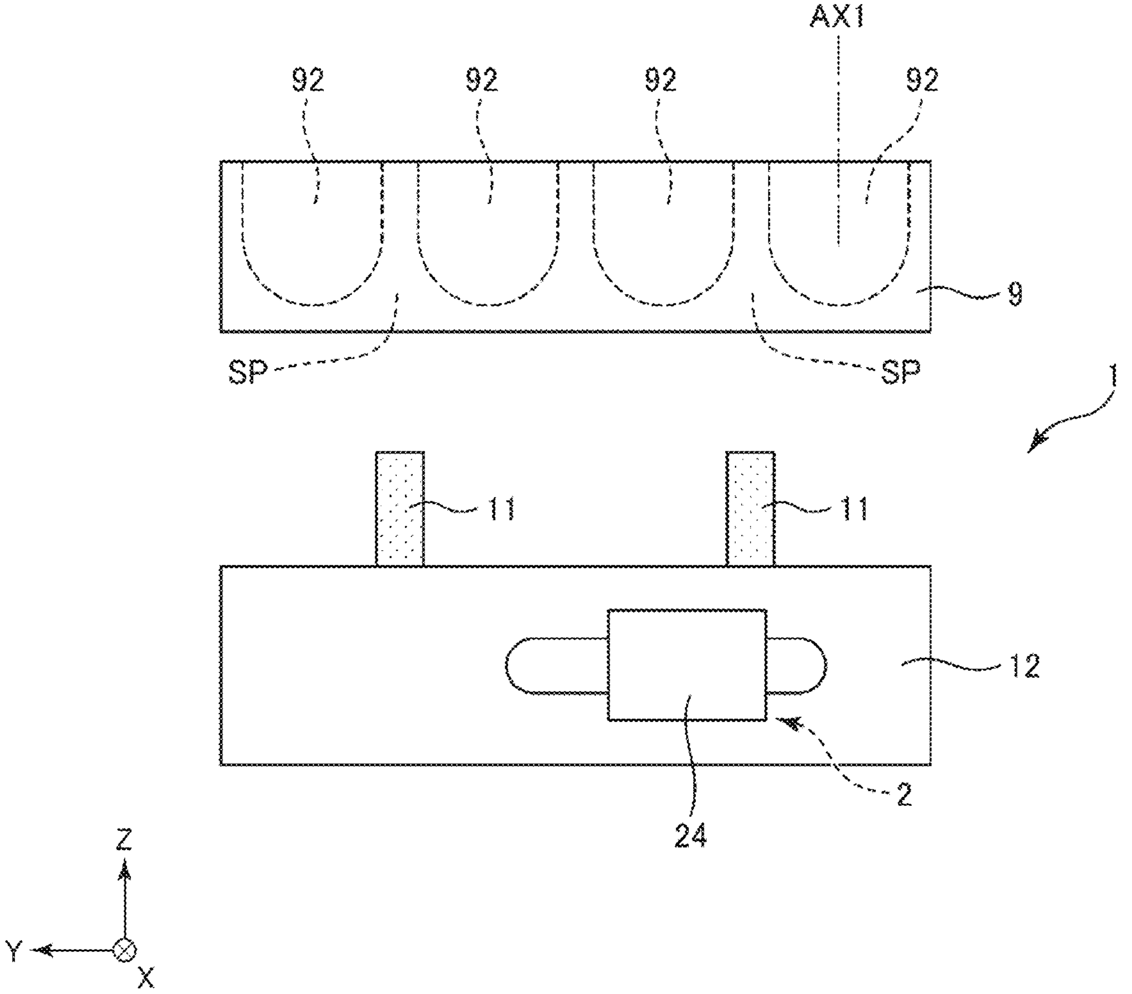
FIG. 2 is a side view of the magnetic separation device and the well plate shown in FIG. 1.
Figure 3:
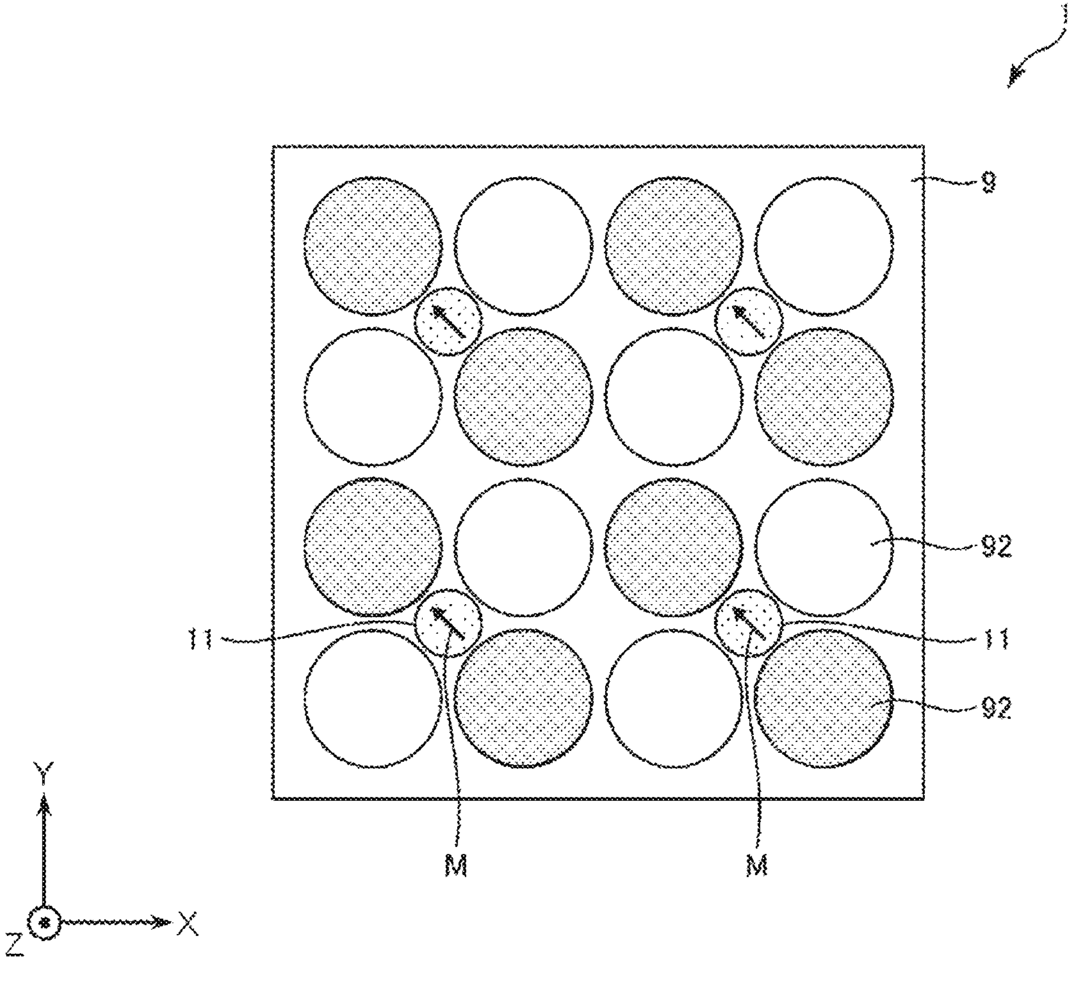
FIG. 3 is a plan view of the magnetic separation device and the well plate shown in FIG. 1.

FIG. 1 is a perspective view showing an example of a magnetic separation device 1 according to the first embodiment and a well plate 9 used therein. FIG. 2 is a side view of the magnetic separation device 1 and the well plate 9 shown in FIG. 1. FIG. 3 is a plan view of the magnetic separation device 1 and the well plate 9 shown in FIG. 1.

The magnetic separation device 1 shown in FIGS. 1 and 2 includes magnets 11 and a base 12 that supports the magnets 11. The magnets 11 protrude upward from an upper surface of the base 12.

As indicated by an arrow ST in FIG. 1, the well plate 9 overlaps the upper surface of the base 12. The well plate 9 is a member including a plurality of wells 92 having a recessed shape, and having a flat plate shape as a whole. In such a well plate 9, for example, magnetic beads and a solution containing a biological substance are accommodated in the wells 92. That is, the wells 92 are accommodation portions that accommodate the solution and the magnetic beads. When a magnetic field is externally applied to the wells 92 that accommodate such a solution and magnetic beads, the solution and the magnetic beads are magnetically separated. In the present specification, such an operation is referred to as a magnetic separation operation. In the magnetically separated state, the solution is discharged with a pipette or the like. Accordingly, the solution can be selectively collected. In the present specification, such an operation is referred to as a liquid discharge operation. The magnetic separation device 1 is used for such a magnetic separation operation and a liquid discharge operation.

In the well plate 9 shown in FIG. 3, as an example, the wells 92 constitute rows arranged at equal intervals in the X-axis direction, and the rows are arranged at equal intervals in the Y-axis direction. Accordingly, the wells 92 shown in FIG. 3 are arranged in a lattice pattern in an X-Y plane. An arrangement pattern of the wells 92 is not limited to the lattice pattern, and may be any pattern. The number of wells 92 provided in one well plate 9 is not particularly limited.

As shown in FIG. 2, each well 92 has a tubular shape extending along a first axis AX1, and is a bottomed recessed portion opening upward. The first axis AX1 is, for example, parallel to the Z-axis. On the other hand, a space SP shown in FIG. 2 is provided between the adjacent wells 92. The space SP opens downward.

When the well plate 9 overlaps the magnetic separation device 1, the magnet 11 is inserted into the space SP from below. Accordingly, as shown in FIG. 3, the magnet 11 is disposed close to the well 92. As a result, a magnetic field is applied to the well 92 by magnetization M of the magnet 11.

The magnetic separation device 1 shown in FIGS. 1 and 2 includes a drive unit 2. The drive unit 2 is accommodated in, for example, the base 12. The drive unit 2 drives the magnet 11 so as to change a posture of the magnet 11 with respect to the base 12. Accordingly, a direction of the magnetization M of the magnet 11 can be changed. When the direction of the magnetization M can be timely changed, occurrence of a spike phenomenon can be controlled in the magnetic beads accommodated in the well 92. Accordingly, problems associated with the occurrence of the spike phenomenon can be solved.

Figure 4:
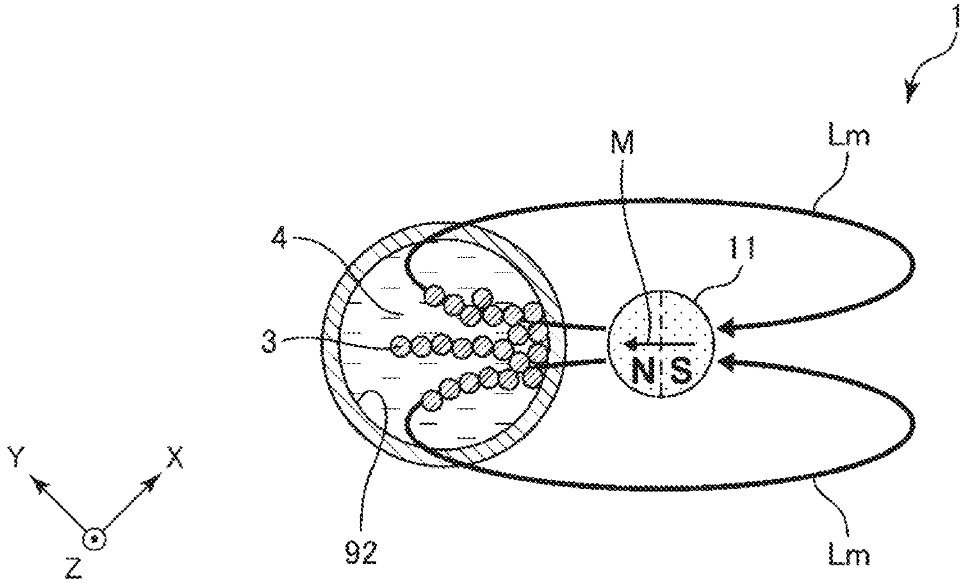
FIG. 4 is a schematic diagram showing an adverse effect of a spike phenomenon, which is one of problems to be solved by the magnetic separation device according to the first embodiment.
Figure 5:
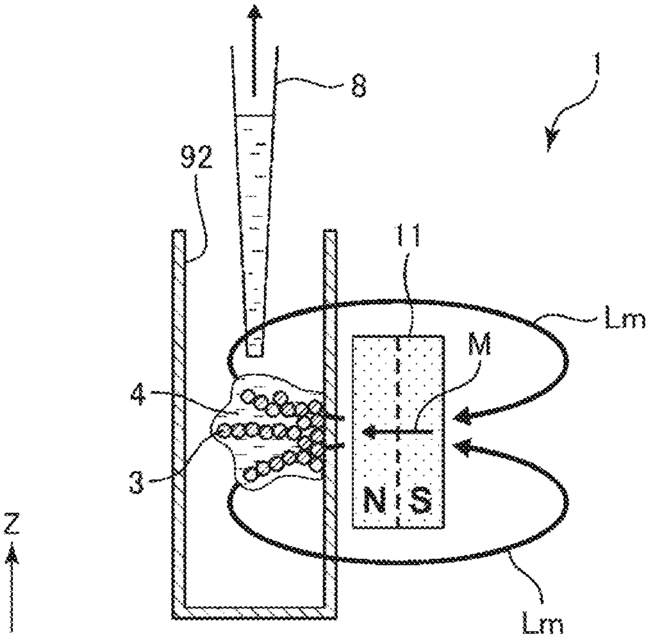
FIG. 5 is a schematic diagram showing an adverse effect of the spike phenomenon, which is one of problems to be solved by the magnetic separation device according to the first embodiment.

FIGS. 4 and 5 are schematic diagrams showing an adverse effect of the spike phenomenon, which is one of the problems to be solved by the magnetic separation device 1 according to the first embodiment. FIGS. 4 and 5 show one well 92, one magnet 11 disposed close to the well 92, and magnetic beads 3 and a liquid 4 accommodated in the well 92.

In FIG. 4, the direction of the magnetization M of the magnet 11 is indicated by an arrow. The magnet 11 shown in FIG. 4 is disposed such that a magnetic pole thereof faces the well 92. Therefore, the direction of the magnetization M of the magnet 11 is along a line segment coupling the magnet 11 and the well 92. Accordingly, a density of magnetic flux lines Lm generated from the magnet 11 increases inside the well 92, and accordingly, the spike phenomenon is likely to occur in the magnetic beads 3 in the well 92. The spike phenomenon is a phenomenon in which the magnetic beads 3 are arranged in a needle shape as shown in FIG. 4. When the spike phenomenon occurs, a specific surface area of all the magnetic beads 3 becomes large, and therefore, even when the liquid discharge operation is performed after the magnetic separation operation, there is a problem that a large amount of the liquid 4 remains between the magnetic beads 3 without being discharged.

FIG. 5 shows an operation of discharging the liquid 4 (liquid discharge operation) in a state in which the magnetic beads 3 and the liquid 4 are separated from each other. In the magnetic separation operation, a pipette 8 is inserted into the well 92 and the liquid 4 is discharged with the magnetic beads 3 magnetically attracted to an inner wall of the well 92. However, when the spike phenomenon occurs in the magnetic beads 3 as shown in FIG. 5, an amount of the liquid 4, which is held by the magnetic beads 3 and is not discharged, increases. As a result, when a target biological substance adsorbed by the magnetic beads 3 is extracted, there is a concern that impurities contained in the liquid 4 are mixed.

In order to solve the above-described problems, the magnetic separation device 1 according to the embodiment includes the drive unit 2 as described above, and can appropriately change the posture of the magnet 11.

Hereinafter, a configuration of the magnetic separation device 1 will be described in detail.

1.1.1. Magnet

The magnetic separation device 1 shown in FIG. 1 includes, for example, four magnets 11. These magnets 11 protrude upward from the upper surface of the base 12. The magnets 11 shown in FIG. 1 have a columnar shape. The magnets 11 each rotate around a central axis of the column as a rotation axis AXR. A rotation angle is, for example, 90°, and may be set larger or smaller than 90° as necessary.

The direction of the magnetization M of the magnet 11 is set as a direction intersecting the rotation axis AXR. Accordingly, when the magnet 11 rotates around the rotation axis AXR, the direction of the magnetization M also rotates. As a result, the magnetic flux density formed in the well 92 can be changed, and the occurrence of the spike phenomenon can be controlled.

The magnet 11 may be an electromagnet, and is preferably a permanent magnet. Accordingly, power supply of the magnetic separation device 1 is not required, and a size and a weight thereof can be easily reduced. Since portability of the magnetic separation device 1 is improved, a degree of freedom in an installation location is increased. When an electromagnet is used as the magnet 11, the same effect as described above can be obtained by forming a rotation magnetic field instead of rotating the magnet 11 itself.

Examples of the permanent magnet include a neodymium iron boron magnet, a samarium-cobalt magnet, a ferrite magnet, and an alnico magnet. Among these, since a sufficient magnetic field can be generated with a smaller size, the neodymium iron boron magnet is preferably used. The neodymium iron boron magnet is preferably subjected to coating such as nickel plating from the viewpoint of securing reliability over time such as corrosion resistance.

A surface magnetic flux density of the magnet 11 is not particularly limited, and is preferably 50 mT or more, and more preferably 200 mT or more. Accordingly, it is possible to increase a moving speed of the magnetic beads 3 in the magnetic separation, and it is possible to prevent detachment of the fixed magnetic beads 3. The surface magnetic flux density of the magnet 11 is measured by, for example, a Gauss meter using a Hall element.

The well plate 9 shown in FIG. 3 has, for example, 16 wells 92. Among these, when the application of the magnetic field is controlled by the four magnets 11, it is conceivable to use eight wells 92 colored in FIG. 3. A magnetic field having the same magnetic flux density can be simultaneously applied to the eight wells 92 by the four magnets 11. Specifically, when the magnetization M of the magnet 11 is set in the direction indicated by the arrow in FIG. 3, a spike phenomenon occurs in the magnetic beads accommodated in the eight colored wells 92. On the other hand, the spike phenomenon hardly occurs in the eight non-colored wells 92. On the other hand, when the direction of the magnetization M is rotated by 90° from the state shown in FIG. 3, the above relationship is reversed. Accordingly, in the example shown in FIG. 3, when it is necessary to align timings of occurrence of the spike phenomenon in the wells 92, half of the 16 wells 92 can be used. However, when it is not necessary to align the timings of the occurrence of the spike phenomenon in all of the 16 wells 92, for example, when using a method of generating the spike phenomenon in eight wells 92 and not generating the spike phenomenon in the remaining eight wells 92, all of the 16 wells 92 can be used.

The magnet 11 shown in FIG. 3 is disposed between two adjacent wells 92. Accordingly, a magnetic field can be applied to two wells 92 by one magnet 11. Therefore, the magnetic field generated from the one magnet 11 can be effectively used.

When the magnet 11 has a columnar shape with the rotation axis AXR as a central axis, a change in a distance between the magnet 11 and the well 92 can be prevented even when the magnet 11 rotates. Therefore, it is possible to prevent a change in the magnetic flux density formed in the well 92 along with the rotation of the magnet 11. Accordingly, it is possible to prevent the magnetic beads 3 fixed to the inner wall of the well 92 from being unintentionally detached or to prevent occurrence of an unintended spike phenomenon. A shape of the magnet 11 is not limited to a columnar shape, and may be, for example, a polygonal prism such as a quadrangular prism, a pentagonal prism, a hexagonal prism, or an octagonal prism, an elliptical prism, an elongated cylinder, or another shape. The arrangement and the number of the wells 92 and the magnets 11 are not limited thereto.

1.1.2. Base

The base 12 is a member that supports the magnets 11 in a rotatable state. The base 12 shown in FIG. 1 is, for example, a box having a rectangular parallelepiped shape. A shape of the base 12 is not particularly limited. The interior of the base 12 shown in FIG. 1 is hollow, and a part of the drive unit 2 is accommodated therein.

1.1.3. Drive Unit

The drive unit 2 shown in FIG. 1 includes pinion gears 21, rack gears 22, and a shaft 23 disposed inside the base 12, and a grip unit 24 disposed outside the base 12.

The pinion gear 21 is a cylindrical gear coupled below the magnet 11. The pinion gear 21 is coaxial with the rotation axis AXR of the magnet 11. The rack gear 22 is a rod-shaped gear extending along the Y-axis. The pinion gear 21 and the rack gear 22 are screwed with each other. Accordingly, when the rack gear 22 moves along the Y-axis, a linear motion of the rack gear 22 is converted into a rotation motion of the pinion gear 21.

The magnetic separation device 1 shown in FIG. 1 includes, for example, two rack gears 22. The rack gear 22 is screwed with two pinion gears 21. An end portion of the rack gear 22 on the minus side of the Y-axis is coupled to the shaft 23 extending along the X-axis. An end portion of the shaft 23 on the minus side of the X-axis is coupled to the grip unit 24.

An operator who operates the magnetic separation device 1 grips and moves the grip unit 24 in the Y-axis direction. Accordingly, the two rack gears 22 move along the Y-axis, and the pinion gear 21 screwed to the rack gear 22 rotates around the rotation axis AXR. As a result, the magnet 11 can be rotated around the rotation axis AXR. Accordingly, it is possible to change the posture of the magnet 11 and control the occurrence of the spike phenomenon.

According to the drive unit 2 having such a configuration, since the magnet 11 can be rotated only by applying the linear motion to the rack gear 22, the magnet 11 can be rotated by a simple operation. Since a momentum of the linear motion is proportional to a momentum of the rotation motion, a rotation amount of the magnet 11 can be easily adjusted.

According to the drive unit 2 as described above, the postures of the four magnets 11 can be changed in synchronization with each other. Accordingly, when the same operation is performed in the plurality of wells 92 by changing the postures of a plurality of magnets 11, labor saving can be achieved.

A configuration of the drive unit 2 is not limited thereto. For example, the drive unit 2 may have a configuration including motors that drive the magnets 11 and a switching device that controls an operation of each motor, or may have a configuration in which a motor that drives the rack gears 22 or the pinion gears 21 is added to the above-described configuration.

Figure 6:
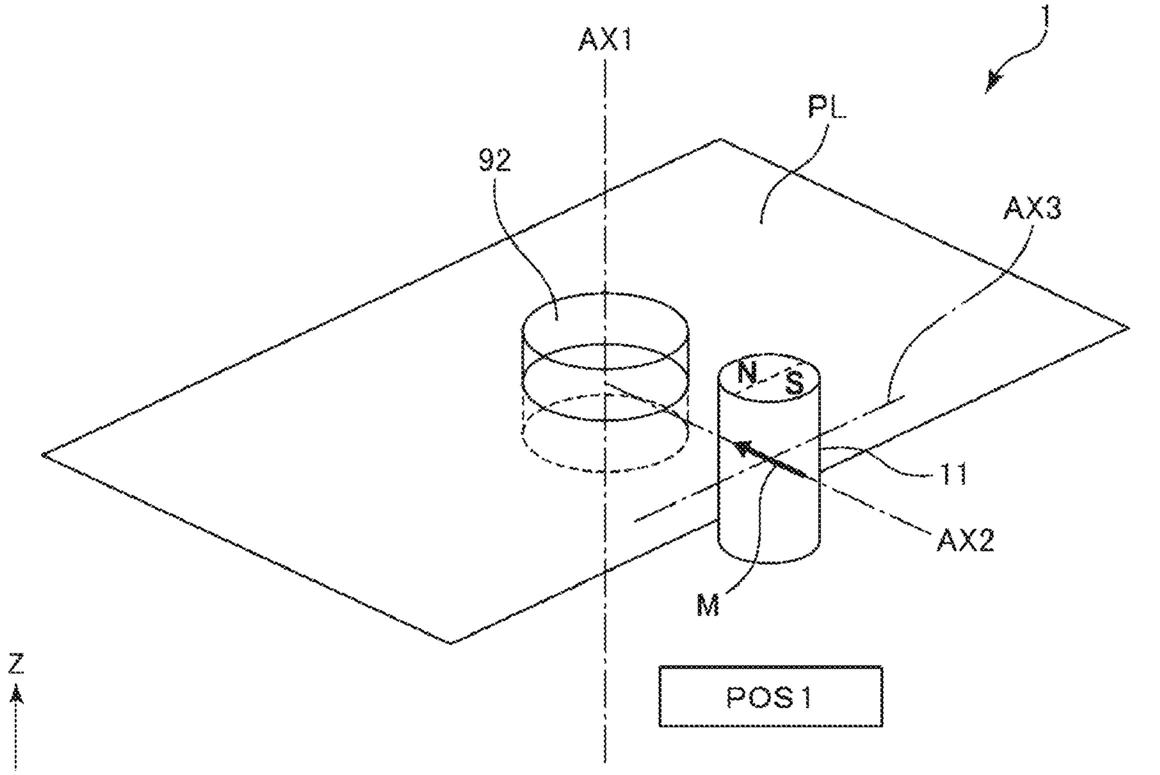
FIG. 6 is a schematic diagram showing a relationship between a direction of magnetization of a magnet and a position of a well in a first posture POS1.
Figure 7:
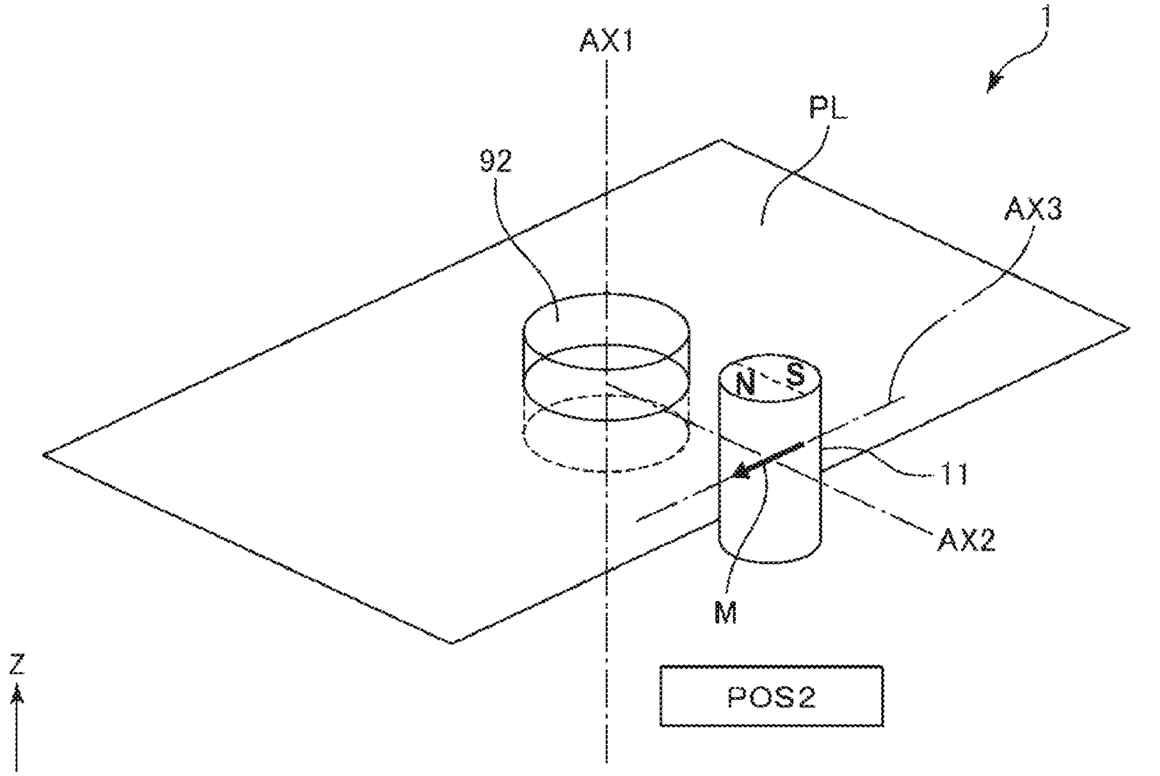
FIG. 7 is a schematic diagram showing a relationship between a direction of magnetization of the magnet and a position of the well in a second posture POS2.

The drive unit 2 changes the posture of the magnet 11 to a first posture POS1 shown in FIG. 6 and a second posture POS2 shown in FIG. 7.

FIG. 6 is a schematic diagram showing relationship between the direction of the magnetization M of the magnet 11 and a position of the well 92 in the first posture POS1. FIG. 7 is a schematic diagram showing a relationship between the direction of the magnetization M of the magnet 11 and a position of the well 92 in the second posture POS2.

In FIGS. 6 and 7, the tubular well 92 (accommodation portion) extends along the first axis AX1 as described above. The first axis AX1 is parallel to the Z-axis. An axis orthogonal to the first axis AX1 is defined as a second axis AX2. Further, when a plane PL including the second axis AX2 is assumed, an axis orthogonal to the second axis AX2 in the plane PL is defined as a third axis AX3.

The first posture POS1 shown in FIG. 6 is a posture in which the direction of the magnetization M of the magnet 11 faces a direction closer to the second axis AX2 than the third axis AX3. Specifically, an angle between the magnetization M and the second axis AX2 in the plane PL may be smaller than an angle between the magnetization M and the third axis AX3 in the plane PL, and is preferably 30° or less, and more preferably 10° or less. FIG. 6 shows a state in which the angle between the magnetization M and the second axis AX2 is 0°.

When the magnet 11 is in the first posture POS1, a magnetic pole of the magnet 11 can substantially face the well 92. Accordingly, the magnetic flux density generated in the well 92 can be sufficiently increased. As a result, since a large magnetic field gradient is formed in the well 92, the magnetic separation speed of the magnetic beads 3 can be increased. However, in this case, a spike phenomenon occurs in the magnetic beads 3.

The second posture POS2 shown in FIG. 7 is a posture in which the direction of the magnetization M of the magnet 11 faces a direction closer to the third axis AX3 than the second axis AX2. Specifically, an angle between the magnetization M and the third axis AX3 in the plane PL may be smaller than an angle between the magnetization M and the second axis AX2 in the plane PL, and is preferably 30° or less, and more preferably 10° or less. FIG. 7 shows a state in which the angle between the magnetization M and the third axis AX3 is 0°.

The second posture POS2 is a posture in which the magnet 11 is rotated around the rotation axis AXR by 90° with respect to the above-described first posture POS1. Since the rotation axis AXR is an axis parallel to the first axis AX1, the magnetic pole of the magnet 11 shown in FIG. 7 does not face the well 92. Accordingly, the magnetic flux density formed in the well 92 can be reduced as compared with the case where the magnet 11 is in the first posture POS1. As a result, the occurrence of the spike phenomenon in the magnetic beads 3 accommodated in the well 92 can be prevented.

1.2. Biological Substance Extraction Method

Next, a biological substance extraction method including the magnetic separation method according to the first embodiment will be described.

Figure 8:
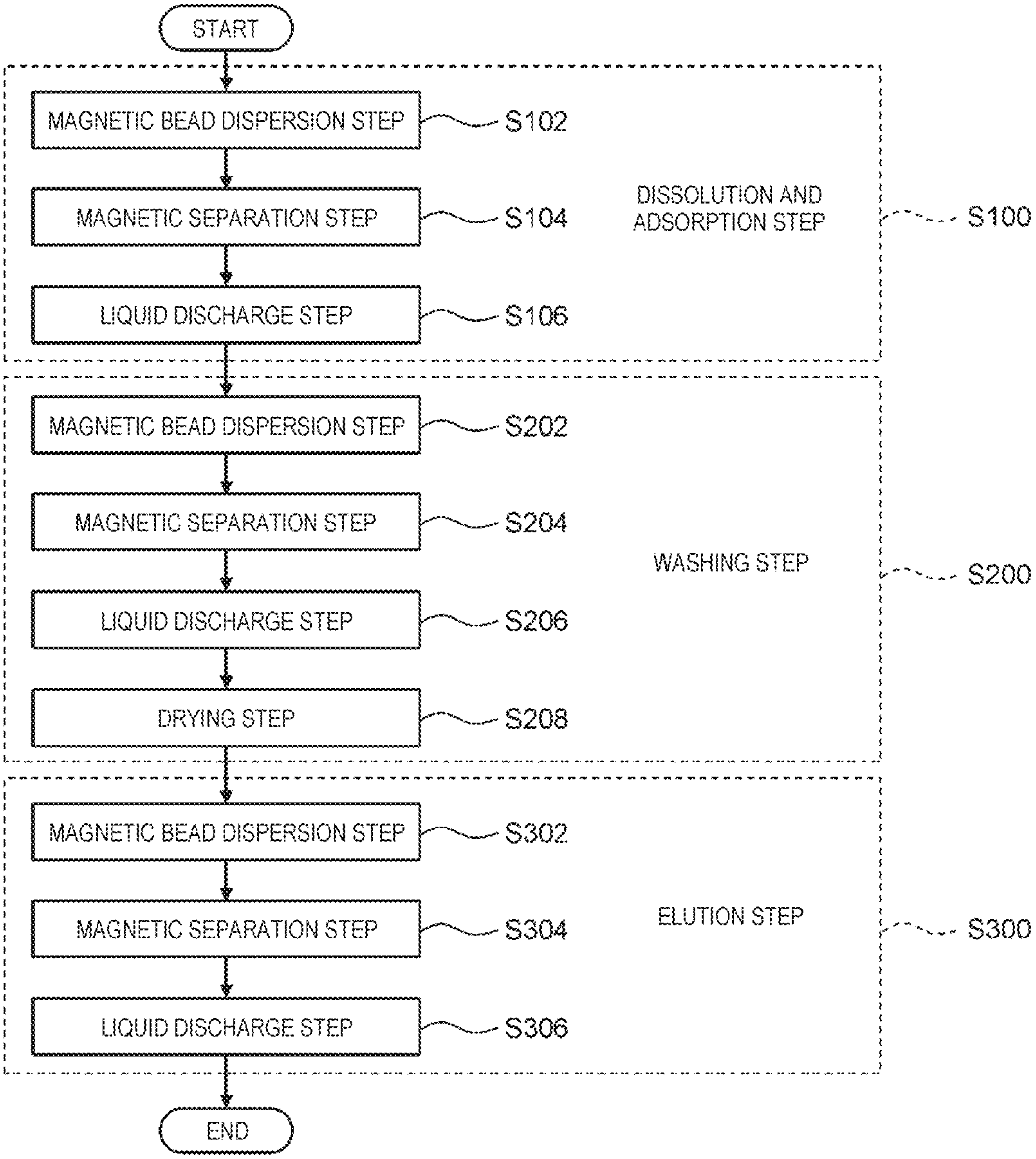
FIG. 8 is a process diagram showing a biological substance extraction method including a magnetic separation method according to the first embodiment.
Figure 9:
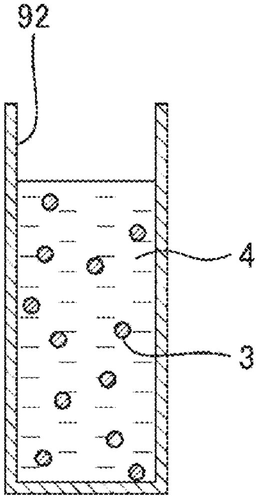
FIG. 9 is a schematic diagram showing the biological substance extraction method shown in FIG. 8.
Figure 10:
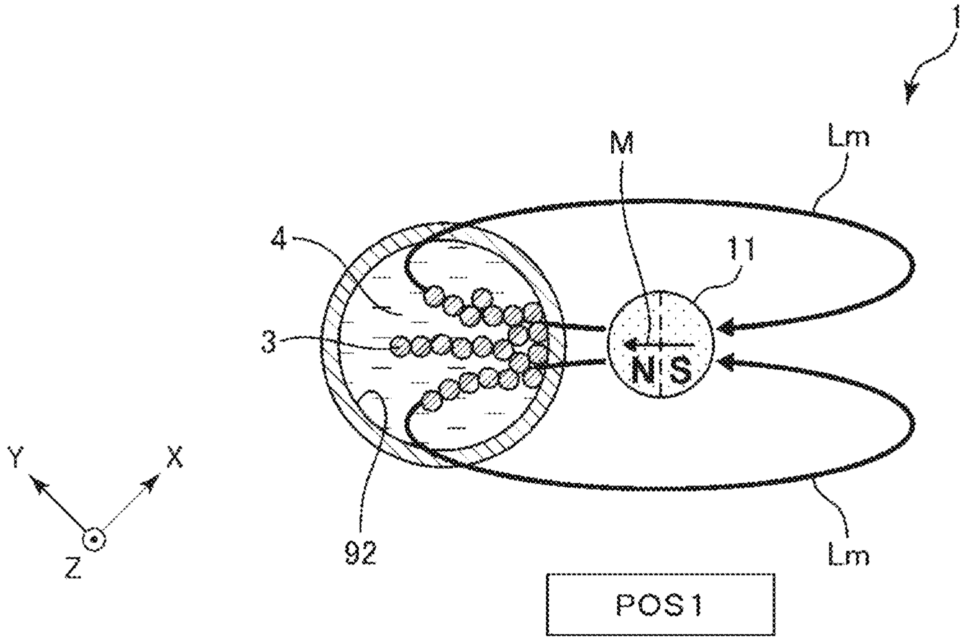
FIG. 10 is a schematic diagram showing the biological substance extraction method shown in FIG. 8.
Figure 11:
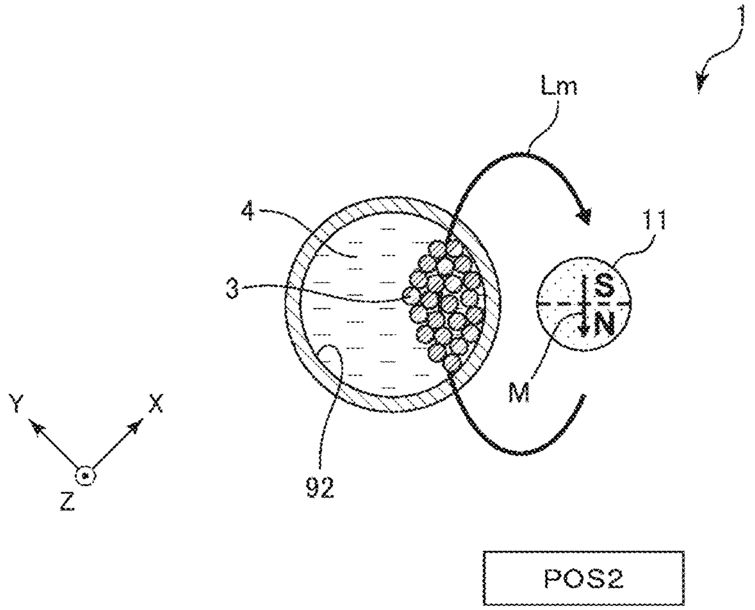
FIG. 11 is a schematic diagram showing the biological substance extraction method shown in FIG. 8.

FIG. 8 is a process diagram showing the biological substance extraction method including the magnetic separation method according to the first embodiment. FIGS. 9 to 11 are schematic diagrams showing the biological substance extraction method shown in FIG. 8.

The biological substance extraction method shown in FIG. 8 includes a dissolution and adsorption step S100, a washing step S200, and an elution step S300.

Examples of the biological substance to be extracted by the biological substance extraction method include substances, for example, nucleic acids such as DNA and RNA, proteins, various cells such as cancer cells, peptides, and viruses. The nucleic acid may be present in a state of being contained in, for example, a biological sample such as a cell or a biological tissue, a virus, or a bacterium. In the biological substance extraction method shown in FIG. 8, such a biological substance is extracted through each step of dissolution and adsorption, washing, and elution.

Hereinafter, each step will be sequentially described. In the following description, a case where the biological substance is a nucleic acid will be described as an example. In the following description, the magnetic separation device 1 is used, but a magnetic field generation device other than the magnetic separation device 1 may be used.

1.2.1. Dissolution and Adsorption Step

The dissolution and adsorption step S100 further includes a magnetic bead dispersion step S102, a magnetic separation step S104, and a liquid discharge step S106. Hereinafter, each step will be sequentially described.

1.2.1.1. Magnetic Bead Dispersion Step

In the magnetic bead dispersion step S102, first, a specimen sample containing a nucleic acid is charged into the well 92 shown in FIG. 9. The well 92 shown in FIG. 9 is one of the wells 92 in FIG. 1. A dispersion liquid containing the magnetic beads 3 and a dissolution and adsorption liquid are further charged into the well 92. Accordingly, in the well 92, as shown in FIG. 9, a stored substance in which the magnetic beads 3 are dispersed in the liquid 4 is obtained. Since the nucleic acid is usually contained in a cell membrane or a nucleus, the nucleic acid is extracted by dissolving and removing the cell membrane or a so-called outer shell of the nucleus by a dissolving action of the dissolution and adsorption liquid. Thereafter, the nucleic acid is adsorbed to the magnetic beads 3 by an adsorption action of the dissolution and adsorption liquid.

The magnetic bead dispersion step S102 is preferably performed in a state in which the well plate 9 is separated from the magnetic separation device 1 shown in FIG. 1. In this state, since the magnet 11 is not inserted into the space SP of the well plate 9, a magnetic field is not applied to the well 92. Therefore, the magnetic beads 3 can be dispersed in the liquid 4. As a result, adsorption efficiency of the nucleic acid to the magnetic beads 3 can be increased. The magnetic bead dispersion step S102 may be omitted, and in this case, the above-described dissolution and adsorption may be performed in the magnetic separation step S104 described later.

As the dissolution and adsorption liquid, for example, a liquid containing a chaotropic substance is used. The chaotropic substance generates chaotropic ions in an aqueous solution, reduces an interaction of water molecules to destabilize the structure, and contributes to the adsorption of the nucleic acid to the magnetic beads 3. Examples of the chaotropic substance present as the chaotropic ions in the aqueous solution include guanidine thiocyanate, guanidine hydrochloride, sodium iodide, potassium iodide, and sodium perchlorate. Among these, guanidine thiocyanate or guanidine hydrochloride having a strong protein denaturation effect is preferably used. A concentration of the chaotropic substance in the dissolution and adsorption liquid varies depending on the chaotropic substance, and is preferably, for example, 1.0 M or more and 8.0 M or less. In particular, when guanidine thiocyanate is used, the concentration thereof is preferably 3.0 M or more and 5.5 M or less. Further, in particular, when guanidine hydrochloride is used, the concentration thereof is preferably 4.0 M or more and 7.5 M or less.

The dissolution and adsorption liquid may contain a surfactant. The surfactant is used to destroy a cell membrane or modify a protein contained in a cell. The surfactant is not particularly limited, and examples thereof include nonionic surfactants such as polyoxyethylene sorbitan monolaurate, Triton-based surfactants, and Tween-based surfactants, and anionic surfactants such as sodium N-lauroylsarcosine. Among these, the nonionic surfactant is preferably used. According to the nonionic surfactant, when the nucleic acid after extraction is analyzed, an influence of the ionic surfactant is reduced. As a result, it is possible to perform analysis by an electrophoresis method and to broaden options for analysis methods.

A concentration of the surfactant in the dissolution and adsorption liquid is not particularly limited, and is preferably 0.1% by mass or more and 2.0% by mass or less.

The dissolution and adsorption liquid may contain at least one of a reducing agent and a chelating agent. Examples of the reducing agent include 2-mercaptoethanol and dithiothreitol. Examples of the chelating agent include disodium dihydrogen ethylenediaminetetraacetic acid dihydrate (EDTA).

A concentration of the reducing agent in the dissolution and adsorption liquid is not particularly limited and is preferably 0.2 M or less. A concentration of the chelating agent in the dissolution and adsorption liquid is not particularly limited and is preferably 0.2 mM or less.

A pH of the dissolution and adsorption liquid is not particularly limited and is preferably neutral with 6 or more and 8 or less. In order to adjust the pH, tris (hydroxy) aminomethane, HCl, or the like may be added as a buffer solution.

In the magnetic bead dispersion step S102, the stored substance in the well 92 is stirred by ultrasonic irradiation, a vortex mixer, hand shaking, or the like as necessary. A stirring time is not particularly limited, and may be 5 seconds or longer and 40 minutes or shorter.

The magnetic beads 3 are not particularly limited as long as the magnetic beads are magnetic particles having residual magnetization and capable of adsorbing the nucleic acid. For example, the magnetic beads 3 contain fine particles of ferrite or magnetic metal particles.

Among these, the magnetic metal particles are preferably used. Since the magnetic metal particles have high saturation magnetization, the moving speed of the magnetic beads 3 can be increased in the magnetic separation. Accordingly, a time required for the magnetic separation can be shortened.

Examples of a composition of the magnetic metal particles include an alloy containing Fe as a main component (Fe-based alloy). Specific examples thereof include an Fe—Co-based alloy, an Fe—Ni-based alloy, an Fe—Co—Ni-based alloy, an Fe—Si-based alloy, an Fe—Si—Cr-based alloy, and an Fe—Si—Cr—B—C based alloy.

A metal structure constituting the magnetic metal particles can take various forms such as a crystalline structure, an amorphous structure, and a nanocrystalline structure. In particular, by using the amorphous structure or the nanocrystalline structure, a coercive force Hc becomes a low value, and dispersibility of the magnetic beads 3 can be improved.

The magnetic bead 3 preferably includes a coating layer that coats a surface of the magnetic metal particle. The coating layer has a function of capturing a biological substance to be extracted. Examples of a constituent material of the coating layer include, in addition to silicon oxide, a composite oxide or a composite containing silicon and one oxide or two or more oxides selected from the group consisting of Al, Ti, V, Nb, Cr, Mn, Sn, and Zr.

An average particle diameter of the magnetic beads 3 is preferably 0.5 μm or more and 50 μm or less, and more preferably 2 μm or more and 20 μm or less. Accordingly, the magnetic beads 3 can be uniformly dispersed in the liquid, and a sufficient amount of the nucleic acid can be adsorbed to the surfaces of the magnetic beads 3. Accordingly, extraction efficiency and detection accuracy of the nucleic acid can be improved.

1.2.1.2. Magnetic Separation Step

In the magnetic separation step S104, a magnetic field acts on the magnetic beads 3 to which the nucleic acid is adsorbed, and the magnetic beads 3 are magnetically attracted. Accordingly, the magnetic beads 3 are moved to and fixed to the inner wall of the well 92. As a result, the magnetic beads 3 in a solid phase can be separated from the liquid 4.

After the magnetic attraction is performed, an acceleration may be applied to the well 92 as necessary. Accordingly, the liquid 4 adhering to the magnetic beads 3 can be shaken accuracy of the magnetic separation can be improved. The acceleration may be a centrifugal acceleration. In order to apply the centrifugal acceleration, a centrifugal separator may be used.

The magnetic separation step S104 is performed in a state in which the well plate 9 overlaps the magnetic separation device 1 shown in FIG. 1. In this state, since the magnet 11 is inserted into the space SP of the well plate 9, a magnetic field can be applied from a side wall of the well 92. Accordingly, the magnetic beads 3 can be magnetically attracted to the inner wall of the well 92.

In the magnetic separation step S104, the magnetic field is applied such that the magnetic flux line Lm passes through the well 92 at an angle closer to the second axis AX2 than the third axis AX3 shown in FIG. 6. The application of such a magnetic field can be implemented by, for example, the magnet 11 in the first posture POS1 as shown in FIG. 10. Accordingly, the density of the magnetic flux lines Lm generated in the well 92 can be sufficiently increased, and the magnetic field gradient formed in the well 92 can be increased. As a result, the magnetic separation speed can be increased, and the time required for the magnetic separation operation can be shortened. However, when the magnet 11 is in the first posture POS1, a spike phenomenon occurs in the magnetic beads 3 as shown in FIG. 10.

1.2.1.3. Liquid Discharge Step

In the liquid discharge step S106, the liquid 4 in the well 92 is discharged by a pipette or the like in a state in which the magnetic beads 3 are fixed to the inner wall of the well 92. Accordingly, the liquid 4 can be separated from the nucleic acid adsorbed by the magnetic beads 3.

Prior to discharging the liquid 4, in the liquid discharge step S106, a magnetic field is applied such that the magnetic flux line Lm passes through the well 92 at an angle closer to the third axis AX3 than the second axis AX2 shown in FIG. 7. The application of such a magnetic field can be implemented by, for example, the magnet 11 in the second posture POS2 as shown in FIG. 11. Accordingly, the density of the magnetic flux lines Lm generated in the well 92 can be reduced, and the occurrence of the spike phenomenon can be prevented. As a result, a surface area of the fixed magnetic beads 3 is reduced more than when the spike phenomenon occurs, so that the amount of the liquid 4 held between the magnetic beads 3 can be reduced. That is, separation efficiency (solid-liquid separability) between the magnetic beads 3 and the liquid 4 can be improved. Accordingly, it is possible to prevent the chaotropic substance contained in the liquid 4 from shifting to the washing step S200 or the elution step S300 described later.

By preventing the occurrence of the spike phenomenon, a space can be easily secured in the well 92. Accordingly, it is possible to discharge the liquid 4 while avoiding contact between the pipette or the like and the magnetic beads 3.

1.2.2. Washing Step

The washing step S200 further includes a magnetic bead dispersion step S202, a magnetic separation step S204, a liquid discharge step S206, and a drying step S208.

In the washing step S200, a magnetic separation operation and a liquid discharge operation are performed in the same manner as in the dissolution and adsorption step S100 described above except that a washing liquid is used as the liquid 4. Accordingly, the magnetic beads 3 to which the nucleic acid is adsorbed are washed. Washing refers to an operation of removing impurities by bringing the magnetic beads 3, to which the nucleic acid is adsorbed, into contact with the washing liquid and then separating the magnetic beads 3 and the washing liquid again in order to remove the impurities adsorbed on the magnetic beads 3.

In the magnetic bead dispersion step S202, similar to the magnetic bead dispersion step S102 described above, the magnetic beads 3 are preferably dispersed in the liquid 4 which is the washing liquid in a state in which a magnetic field is not applied to the well 92. The magnetic bead dispersion step S202 may be omitted, and in this case, the above washing may be performed in the magnetic separation step S204 described later.

The washing liquid is not particularly limited as long as the washing liquid is a liquid that does not promote elution of the nucleic acid and does not promote binding of the impurities to the magnetic beads 3. Examples of the washing liquid include organic solvents such as ethanol, isopropyl alcohol, and acetone, aqueous solutions of the organic solvents, and a low salt concentration aqueous solution. Examples of the low salt concentration aqueous solution include a buffer solution. A salt concentration in the low salt concentration aqueous solution is preferably 0.1 mM or more and 100 mM or less, and more preferably 1 mM or more and 50 mM or less. A salt for the buffer solution is not particularly limited, and a salt of such as TRIS, HEPES, PIPES, or phosphoric acid is preferably used.

The washing liquid may contain a surfactant such as Triton (registered trademark), Tween (registered trademark), or SDS. The washing liquid may contain a chaotropic substance such as guanidine hydrochloride. A pH of the washing liquid is not particularly limited.

In the magnetic separation step S204, similar to the magnetic separation step S104 described above, a magnetic field is applied to the well 92 to separate the magnetic beads 3 from the liquid 4 which is the washing liquid. In the magnetic separation step S204, for example, the magnetic separation speed can be increased by setting the magnet 11 to the first posture POS1.

In the liquid discharge step S206, similar to the liquid discharge step S106 described above, the liquid 4 as the washing liquid is discharged in a state in which the magnetic beads 3 are fixed to the inner wall of the well 92. In the liquid discharge step S206, for example, by setting the magnet 11 to the second posture POS2, the occurrence of the spike phenomenon can be prevented, and thus the separation efficiency (solid-liquid separability) between the magnetic beads 3 and the liquid 4 can be improved. Accordingly, washing efficiency of the magnetic beads 3 to which the nucleic acid is adsorbed can be improved, and the shifting of the impurities contained in the liquid 4 to the elution step S300 described later can be prevented.

In the drying step S208, the magnetic beads 3 remaining in the well 92 are dried. Accordingly, the washing liquid held between the magnetic beads 3 can be more reliably removed, and the shifting of the washing liquid to the elution step S300 can be prevented. Drying may be performed by natural drying or by forced drying accompanied by heating, blowing, or the like.

Similar to the magnetic separation step S204 described above, the drying step S208 is performed while applying a magnetic field such that the magnetic flux line Lm passes through the well 92 at an angle closer to the second axis AX2 than the third axis AX3. The drying step S208 is preferably performed while applying a magnetic field such that the magnetic flux line Lm along the second axis AX2 passes through the well 92. Accordingly, the spike phenomenon occurs and the surface area of the magnetic beads 3 can be increased, so that drying efficiency can be improved. The drying step S208 may be performed as necessary, and may be omitted.

In the washing step S200, the above-described steps may be repeated once or more. The washing step S200 may be performed as necessary, and may be omitted when washing is not necessary.

1.2.3. Elution Step

The elution step S300 further includes a magnetic bead dispersion step S302, a magnetic separation step S304, and a liquid discharge step S306.

In the elution step S300, a magnetic separation operation and a liquid discharge operation are performed in the same manner as in the dissolution and adsorption step S100 and the washing step S200 described above except that an eluate is used as the liquid 4. Accordingly, the nucleic acid is eluted into the eluate from the magnetic beads 3 to which the nucleic acid is adsorbed. The elution refers to an operation in which the nucleic acid is shifted to the eluate by bringing the magnetic beads 3, to which the nucleic acid is adsorbed, into contact with the eluate and then separating the magnetic beads 3 and the eluate again.

In the magnetic bead dispersion step S302, similar to the magnetic bead dispersion step S102 described above, the magnetic beads 3 are preferably dispersed in the liquid 4 which is the eluate in a state in which a magnetic field is not applied to the well 92. The magnetic bead dispersion step S302 may be omitted, and in this case, the above elution may be performed in the magnetic separation step S304 described later.

The eluate is not particularly limited as long as the eluate is a liquid that promotes the elution of the nucleic acid from the magnetic beads 3 to which the nucleic acid is adsorbed. For example, in addition to water such as sterilized water or pure water, a TE buffer solution, that is, an aqueous solution containing a 10 mM Tris-HCl buffer solution and 1 mM EDTA and having a pH of about 8 is preferably used.

The eluate may contain a surfactant such as Triton (registered trademark), Tween (registered trademark), or SDS. In addition, the eluate may contain sodium azide as a preservative.

In the magnetic bead dispersion step S302, the eluate may be heated. Accordingly, the elution of the nucleic acid can be promoted. A heating temperature for the eluate is not particularly limited, and is preferably 70° C. or higher and 200° C. or lower, more preferably 80° C. or higher and 150° C. or lower, and still more preferably 95° C. or higher and 125° C. or lower.

Examples of a heating method include a method in which an eluate heated in advance is supplied, and a method in which an unheated eluate is supplied into a container and is then heated. A heating time is not particularly limited, and may be 30 seconds or longer and 10 minutes or shorter.

In the magnetic separation step S304, similar to the magnetic separation step S104 described above, a magnetic field is applied to the well 92 to separate the magnetic beads 3 from the liquid 4 which is the eluate. In the magnetic separation step S304, for example, the magnetic separation speed can be increased by setting the magnet 11 to the first posture POS1.

In the liquid discharge step S306, similar to the liquid discharge step S106 described above, the liquid 4 as the eluate is discharged in a state in which the magnetic beads 3 are fixed to the inner wall of the well 92. In the liquid discharge step S306, for example, by setting the magnet 11 to the second posture POS2, the occurrence of the spike phenomenon can be prevented, and thus the separation efficiency between the magnetic beads 3 and the liquid 4 can be improved. Accordingly, a yield of the nucleic acid can be increased.

2. Second Embodiment

Next, a second embodiment will be described.

Figure 12:
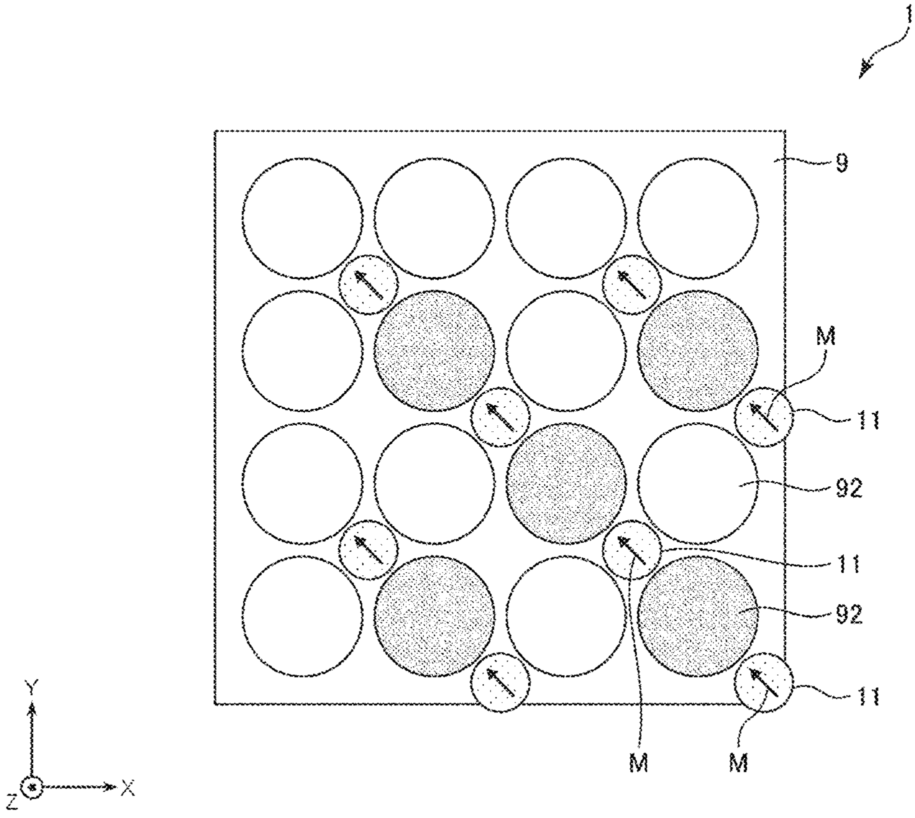
FIG. 12 is a plan view showing an example of a magnetic separation device according to a second embodiment and a well plate used therein.
Figure 13:
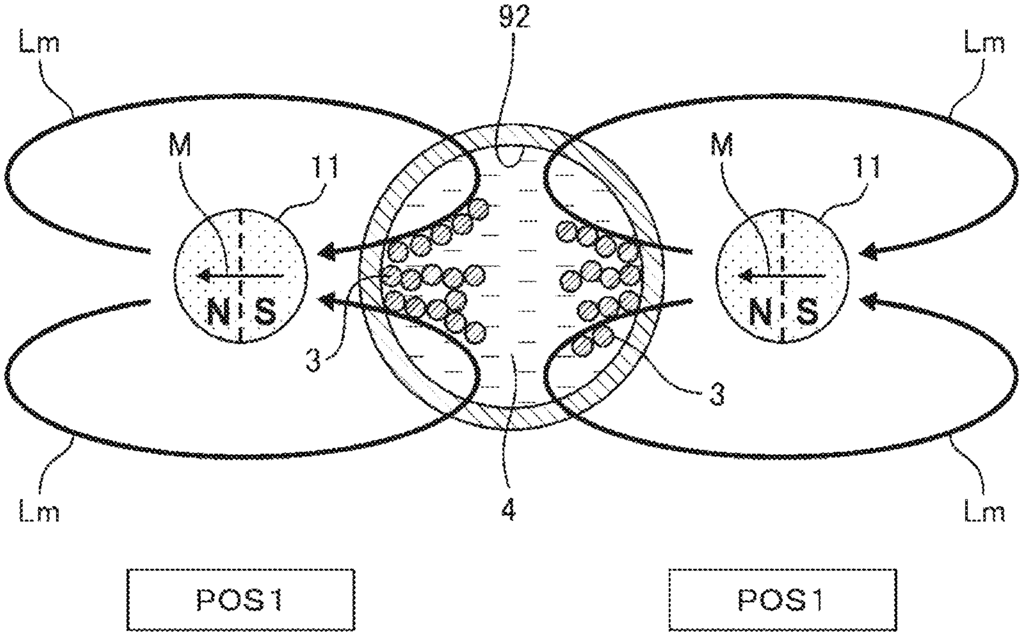
FIG. 13 is a schematic diagram showing a biological substance extraction method including a magnetic separation method according to the second embodiment.
Figure 14:
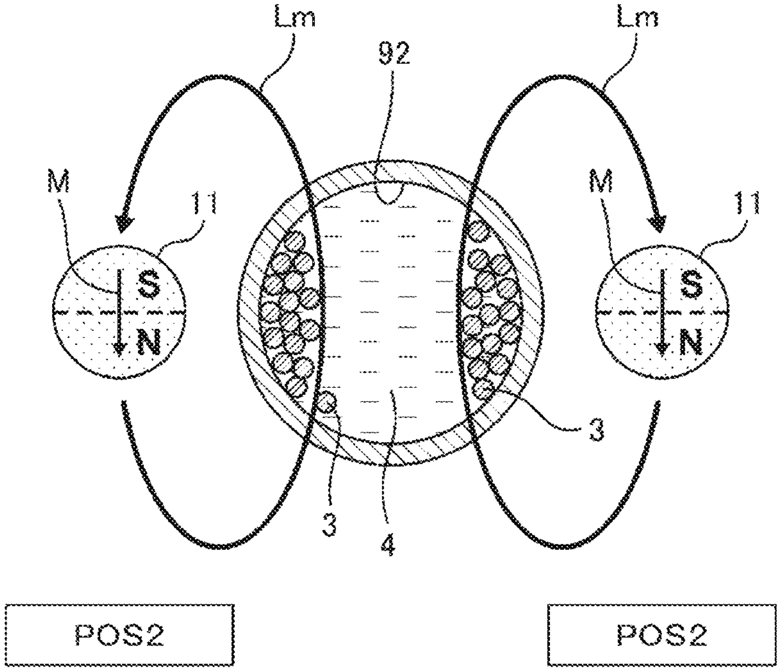
FIG. 14 is a schematic diagram showing the biological substance extraction method including the magnetic separation method according to the second embodiment.

FIG. 12 is a plan view showing an example of the magnetic separation device 1 according to the second embodiment and the well plate 9 used therein. FIGS. 13 and 14 are schematic diagrams showing a biological substance extraction method including a magnetic separation method according to the second embodiment.

Hereinafter, the second embodiment will be described. In the following description, differences from the first embodiment will be mainly described, and the description of similar matters will be omitted. In the drawings, the same components as those of the first embodiment are denoted by the same reference numerals.

The second embodiment is the same as the first embodiment except that a magnetic field is applied to one well 92 by two magnets 11.

First, the magnetic separation device according to the second embodiment will be described.

The magnetic separation device 1 shown in FIG. 12 includes, for example, eight magnets 11. Then, in the magnetic separation device 1 shown in FIG. 12, the two magnets 11 are disposed at positions opposite to each other via the well 92. Accordingly, since the magnetic field can be applied to the well 92 from the two magnets 11, the magnetic beads 3 can be divided into two portions and fixed to the two portions. As a result, the amount of the magnetic beads 3 fixed to one portion can be reduced, and the time required for the magnetic separation operation can be further shortened. In addition, by reducing the amount of the magnetic beads 3 fixed to one portion, a magnetic adsorption force generated in each magnetic bead 3 can be increased, and detachment of the magnetic beads 3 can be prevented.

The well plate 9 shown in FIG. 12 includes, for example, 16 wells 92, and when the application of the magnetic field is controlled by eight magnets 11, it is conceivable to use five wells 92 colored in FIG. 12. In the five wells 92, the same magnetic flux density is formed by the eight magnets 11. Specifically, when the magnetization M of the magnet 11 is set in a direction indicated by an arrow in FIG. 12, the magnetic fields generated from the two magnets 11 can be applied to the five colored wells 92 without canceling each other out, and a high magnetic flux density can be formed. Accordingly, in the five colored wells 92, the above-described effect can be simultaneously obtained. When a timing at which the effect is obtained may be different, the uncolored well 92 can also be used. The arrangement and the number of the wells 92 and the magnets 11 are not limited thereto.

Next, the magnetic separation method according to the second embodiment will be described.

As described above, in the biological substance extraction method including the magnetic separation method according to the first embodiment, the magnetic separation speed in the magnetic separation step and the separation efficiency between the magnetic beads 3 and the liquid 4 in the liquid discharge step are improved by timely changing the posture of the magnet 11.

In this regard, in a magnetic separation step of the magnetic separation method according to the second embodiment, two magnets 11 are disposed adjacent to one well 92, and each magnet 11 is set to the first posture POS1 shown in FIG. 13. In this case, the magnetization M of the two magnets 11 has the same direction. Accordingly, the magnetic fields generated from the magnets 11 can be applied to the well 92 without canceling each other out, and a high magnetic flux density can be formed at two positions in the well 92. As a result, the magnetic beads 3 can be divided into two portions and fixed to the two portions, and a time required for the magnetic separation operation can be further shortened. Since the spike phenomenon can be generated in the magnetic beads 3 in a state in which the magnetic beads 3 are divided into the two portions, the surface area of the entire magnetic beads 3 can be particularly increased, and a time required for drying the magnetic beads 3 can be further shortened.

In a liquid discharge step of the magnetic separation method according to the second embodiment, the two magnets 11 are set to the second posture POS2 shown in FIG. 14. Accordingly, the occurrence of the spike phenomenon in the magnetic beads 3 can be prevented, and the surface area can be reduced. As a result, the separation efficiency between the magnetic beads 3 and the liquid 4 can be improved.

In the second embodiment as described above, the same effects as those of the first embodiment can also be obtained.

3. Third Embodiment

Next, a third embodiment will be described.

Figure 15:
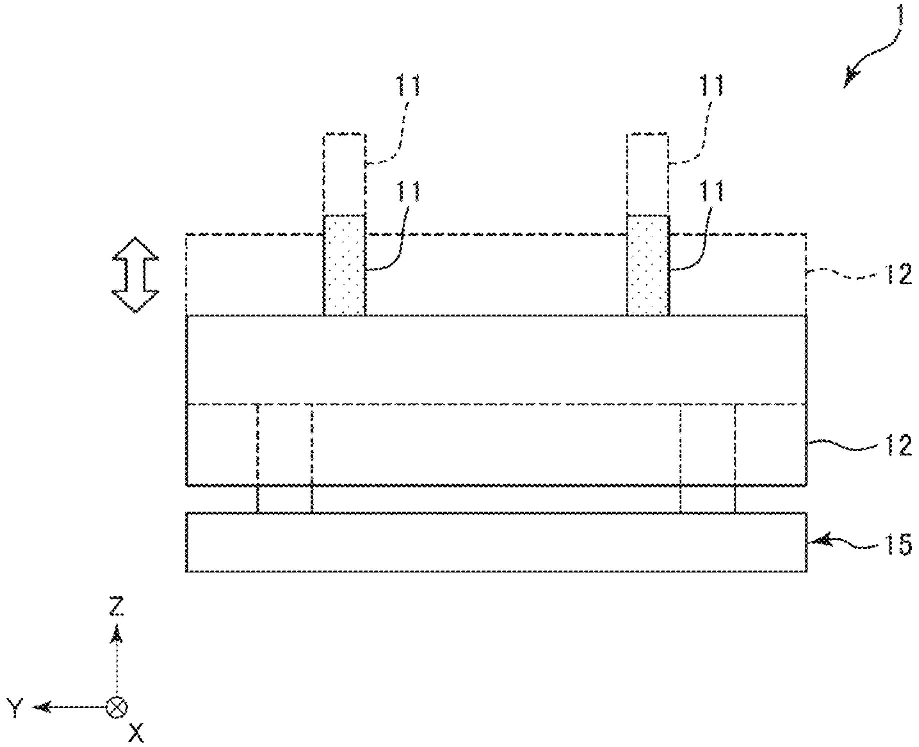
FIG. 15 is a side view showing a magnetic separation device according to a third embodiment.

FIG. 15 is a side view showing the magnetic separation device 1 according to the third embodiment.

Hereinafter, the third embodiment will be described. In the following description, differences from the first embodiment will be mainly described, and the description of similar matters will be omitted. In FIG. 15, the same components as those of the first embodiment are denoted by the same reference numerals.

The third embodiment is the same as the first embodiment except that a moving stage 15 that moves the base 12 along the first axis AX1 is provided.

The magnetic separation device 1 shown in FIG. 15 includes the moving stage 15 that supports a lower surface of the base 12 and moves the base 12 up and down. The moving stage 15 has a flat plate shape and supports the lower surface of the base 12. The moving stage 15 is held by a drive unit (not shown) at any position along the first axis AX1 shown in FIG. 2, that is, the Z-axis shown in FIG. 15. Further, the moving stage 15 may be held at two positions set in advance. Accordingly, when the well plate is held above the base 12, the base 12 can be held at a position at which the magnet 11 is inserted into the space of the well plate and a position at which the magnet 11 is pulled out from the space. As a result, it is possible to easily switch the state between a magnetic field application state in which the magnetic field from the magnet 11 is applied to the well and a magnetic field non-application state in which the magnetic field is not applied. Accordingly, for example, in the magnetic separation step described above, the magnetic field application state is selected, and in the magnetic bead dispersion step described above, the magnetic field non-application state is selected. Therefore, this contributes to a reduction in man-hours in both the steps.

In the third embodiment as described above, the same effects as those of the first embodiment can also be obtained.

The moving stage 15 may be a stage that moves the base 12 described above, or may be a stage that is disposed between the base 12 and the well plate and moves the well plate up and down. Instead of the moving stage 15, a mechanism for accommodating the magnet 11 inside the base 12 or protruding the magnet 11 may be provided.

4. Fourth Embodiment

Next, a fourth embodiment will be described.

Figure 16:
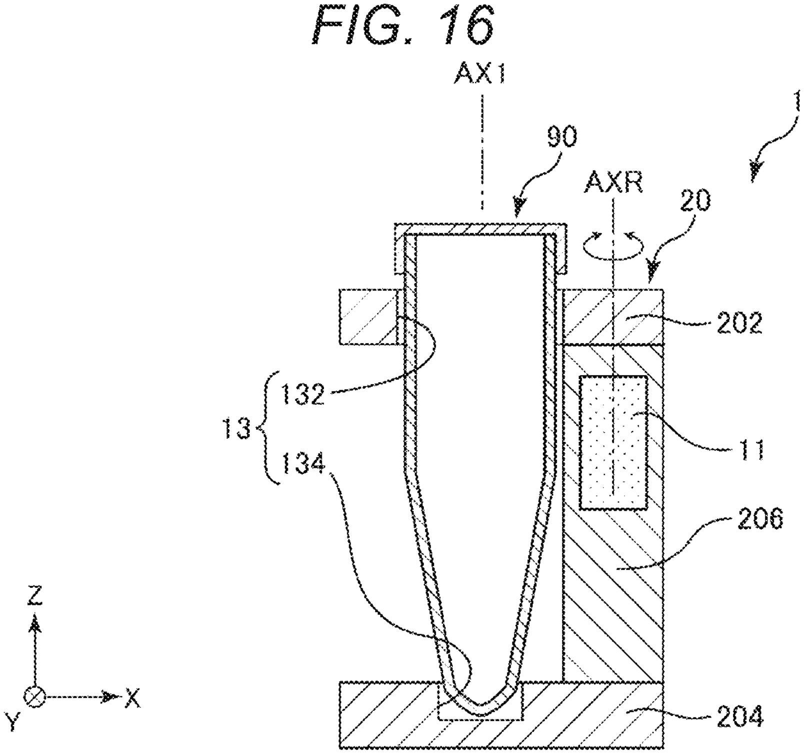
FIG. 16 is a side view showing an example of a magnetic separation device according to a fourth embodiment and a microtube used therein.

FIG. 16 is a side view showing an example of the magnetic separation device 1 according to the fourth embodiment and a microtube 90 used therein.

Hereinafter, the fourth embodiment will be described. In the following description, differences from the first embodiment will be mainly described, and the description of similar matters will be omitted. In FIG. 16, the same components as those of the first embodiment are denoted by the same reference numerals.

The fourth embodiment is the same as the first embodiment except that an insertion portion 13 (accommodation portion) into which a container such as the microtube 90 is inserted is provided.

The magnetic separation device 1 shown in FIG. 16 includes a stand 20 as a base, the magnet 11, and a drive unit (not shown).

The stand 20 includes an upper plate 202, a lower plate 204, and a side plate 206 that couples the upper plate 202 and the lower plate 204 to each other. The upper plate 202 and the lower plate 204 each have a plate shape extending along the X-Y plane. The side plate 206 has a plate shape extending along a Y-Z plane.

The upper plate 202 has a through hole 132. The through hole 132 penetrates the upper plate 202 along the first axis AX1 parallel to the Z-axis. The lower plate 204 has a recessed portion 134 that is open on an upper surface. The through hole 132 and the recessed portion 134 constitute the insertion portion 13. The microtube 90 is inserted into and held by the insertion portion 13. That is, the microtube 90 can be held in an upright state by inserting the microtube 90 into the through hole 132 and inserting a lower end of the microtube 90 into the recessed portion 134.

The magnet 11 is provided on the side plate 206. The magnet 11 is rotated around the rotation axis AXR by the drive unit.

A magnetic flux density formed in the insertion portion 13 can be changed by rotating the magnet 11 in a state in which the microtube 90 is inserted into the insertion portion 13. Accordingly, when the magnetic beads are accommodated in the microtube 90, occurrence of the spike phenomenon in the magnetic beads can be controlled.

In the fourth embodiment described above, the same effects as those of the first embodiment can also be obtained.

The magnetic separation device 1 may include a plurality of insertion portions 13. A configuration, a shape, or the like of the insertion portion 13 is not limited to the above.

5. Effects of Embodiment

As described above, the magnetic separation device 1 according to the embodiment includes the magnets 11, the base 12, and the drive unit 2. The magnet 11 is provided at a position adjacent to the well 92 (tubular accommodation portion) extending along the first axis AX1, and has the magnetization M for applying a magnetic field to the well 92. The base 12 supports the magnet 11. The drive unit 2 changes the posture of the magnet 11 between the first posture POS1 and the second posture POS2. The first posture POS1 is a posture in which, when an axis orthogonal to the first axis AX1 is the second axis AX2 and an axis orthogonal to the second axis AX2 in the plane PL including the second axis AX2 is the third axis AX3, the direction of the magnetization M faces a direction closer to the second axis AX2 than the third axis AX3. The second posture POS2 is a posture in which the direction of the magnetization M faces a direction closer to the third axis AX3 than the second axis AX2.

According to such a configuration, the magnetic separation device 1 capable of timely changing the direction of the magnetization M of the magnet 11 is obtained. According to the magnetic separation device 1, it is possible to switch a magnitude of the magnetic flux density formed in the well 92, and accordingly, the occurrence of the spike phenomenon can be controlled. Accordingly, for example, during the magnetic separation operation, the magnet 11 is set to the first posture POS1 to increase the magnetic separation speed, and during the liquid discharge operation, the magnet 11 is set to the second posture POS2 to increase the separation efficiency (solid-liquid separability) between the magnetic beads 3 and the liquid 4. Accordingly, it is possible to implement the magnetic separation device 1 excellent in the magnetic separation speed and the separation efficiency between the magnetic beads 3 and the liquid 4.

The magnet 11 may rotate around the rotation axis AXR parallel to the first axis AX1. The drive unit 2 may rotate the magnet 11 around the rotation axis AXR.

Accordingly, when the magnet 11 rotates around the rotation axis AXR, the direction of the magnetization M also rotates. As a result, the density of the magnetic flux lines Lm formed in the well 92 can be changed, and the occurrence of the spike phenomenon can be controlled.

The magnet 11 preferably has a columnar shape with the rotation axis AXR as a central axis. In this case, even when the magnet 11 rotates, a change in the distance between the magnet 11 and the well 92 can be prevented. Therefore, it is possible to prevent a change in the magnetic flux density formed in the well 92 along with the rotation of the magnet 11. Accordingly, it is possible to prevent the magnetic beads 3 fixed to the inner wall of the well 92 from being unintentionally detached or to prevent occurrence of an unintended spike phenomenon.

Two magnets 11 may be provided at positions opposite to each other via the well 92 (accommodation portion).

Accordingly, a high magnetic flux density can be formed at two positions in the well 92. As a result, the magnetic beads 3 can be magnetically separated into two portions, and a time required for the magnetic separation operation can be further shortened. Since the magnetic beads 3 can be divided into the two portions and fixed to the two positions and a spike phenomenon can be generated in the magnetic beads 3, the surface area of the magnetic beads 3 can be particularly increased, and a time required for drying the magnetic beads 3 can be further shortened.

It is preferable that the magnet 11 is disposed such that the magnet 11 is positioned between adjacent wells 92 when the well plate 9 in which the plurality of wells 92 (accommodation portions) accommodating the magnetic beads 3 are arranged overlaps the magnetic separation device 1.

According to such a configuration, a magnetic field can be applied from the side wall of the well 92. Accordingly, the magnetic beads 3 can be magnetically attracted to the inner wall of the well 92. In this state, operability when the liquid discharge operation is performed by a pipette or the like can be improved.

The accommodation portion may be the insertion portion 13 into which the microtube 90 (container) accommodating the magnetic beads is inserted.

Accordingly, when the magnetic beads are accommodated in the microtube 90, occurrence of the spike phenomenon in the magnetic beads can be controlled. As a result, even when a container such as the microtube 90 is used, it is possible to implement the magnetic separation device 1 excellent in both the magnetic separation speed and the separation efficiency between the magnetic beads 3 and the liquid 4.

The plurality of magnets 11 may be provided, and in this case, the drive unit 2 may change the postures of the magnets 11 in synchronization with each other.

Accordingly, it is possible to save labor in the operation of changing the postures of the plurality of magnets 11.

The drive unit 2 may include the pinion gears 21 and the rack gears 22. The pinion gear 21 is coupled to the magnet 11. The rack gear 22 is screwed with the pinion gear 21.

According to such a configuration, since the magnet 11 can be rotated only by applying a linear motion to the rack gear 22, the magnet 11 can be rotated by a simple operation. Since a momentum of the linear motion is proportional to a momentum of the rotation motion, a rotation amount of the magnet 11 can be easily adjusted.

The moving stage 15 that moves the base 12 along the first axis AX1 may be further provided.

According to such a configuration, for example, it is possible to easily switch the state between a magnetic field application state in which the magnetic field from the magnet 11 is applied to the well 92 and a magnetic field non-application state in which the magnetic field is not applied. Therefore, in the magnetic separation step, the magnetic field application state is selected, and in the magnetic bead dispersion step, the magnetic field non-application state is selected. Therefore, this contributes to a reduction in man-hours in both the steps.

The magnetic separation method according to the embodiment includes a magnetic separation step and a liquid discharge step. In the magnetic separation step, the magnetic beads 3 and the liquid 4 are separated from each other by applying a magnetic field to the well 92 (tubular accommodation portion) that accommodates the magnetic beads 3 and the liquid 4 to fix the magnetic beads 3 to the inner wall of the well 92. In the liquid discharge step, the liquid 4 is discharged in a state in which the magnetic beads 3 and the liquid 4 are separated from each other. An axis along an extending direction of the well 92 is defined as the first axis AX1, an axis orthogonal to the first axis AX1 in the plane PL orthogonal to the first axis AX1 is defined as the second axis AX2, and an axis orthogonal to the second axis AX2 in the plane PL is defined as the third axis AX3. At this time, in the magnetic separation step, the magnetic field is applied at an angle closer to the second axis AX2 than the third axis AX3, and in the liquid discharge step, the magnetic field is applied at an angle closer to the third axis AX3 than the second axis AX2.

According to such a configuration, it is possible to switch a magnitude of the magnetic flux density formed in the well 92 by switching the direction of the magnetic field to be applied, and accordingly, the occurrence of the spike phenomenon can be controlled. Accordingly, for example, during the magnetic separation operation, the density of the magnetic flux lines Lm generated in the well 92 is increased to increase the magnetic separation speed, and during the liquid discharge operation, the density of the magnetic flux lines Lm is decreased to prevent the occurrence of the spike phenomenon, thereby improving the separation efficiency (solid-liquid separability) between the magnetic beads 3 and the liquid 4. That is, the magnetic separation speed and the separation efficiency between the magnetic beads 3 and the liquid 4 can be improved.

The magnetic separation method may further include a drying step of drying the magnetic beads 3 separated from the liquid 4. In the drying step, the magnetic field is preferably applied at an angle closer to the second axis AX2 than the third axis AX3.

According to such a configuration, since the surface area of the magnetic beads 3 can be increased, drying efficiency can be improved.

The magnetic separation method may further include a magnetic bead dispersion step of dispersing the magnetic beads 3 in the liquid 4. Then, in the magnetic separation step and the liquid discharge step, a magnetic field may be applied to the well 92 by bringing the magnet 11 close to the well 92 (accommodation portion), and in the magnetic bead dispersion step, the application of the magnetic field to the well 92 may be released by moving the magnet 11 away from the well 92.

According to such a configuration, since the application of the magnetic field can be controlled only by moving the magnet 11 closer or far away, the above-described effects can be easily obtained.

Although the magnetic separation device and the magnetic separation method according to the present disclosure are described above based on the illustrated embodiments, the present disclosure is not limited thereto.

For example, the magnetic separation method according to the present disclosure may be a method in which any target step is added to the above-described embodiment. In the magnetic separation device according to the present disclosure, each part of the above-described embodiment may be replaced with any configuration having the same function, or any configuration may be added to the above-described embodiment.

Examples

Next, specific examples of the present disclosure will be described.

6. Evaluation of Magnetic Separation Speed

First, magnetic beads were dispersed in pure water at 25° C. so as to have a concentration of 0.1% by mass to prepare a dispersion liquid. Next, the dispersion liquid charged into a spectroscopic cell, and stirring by was ultrasonic irradiation and stirring by a vortex mixer were performed. A stirring time was 1 minute. Next, the spectroscopic cell subjected to the stirring treatment was quickly set in a cell holder of a spectrophotometer. A magnet was attached to the cell holder in advance in accordance with a position at which the spectroscopic cell was disposed. When the spectroscopic cell was set, a shortest distance between an outer wall of the spectroscopic cell and the magnet was set to 2.0 mm, and a magnet having a surface magnetic flux density of 180 mT was used as the magnet.

Next, simultaneously with the start of standing of the spectroscopic cell, measurement of an absorbance at a wavelength of 550 nm in the spectroscopic cell was started. Then, the measurement of the absorbance was repeated by changing a posture of the magnet (direction of magnetization), and a graph was created based on a measurement result.

Figure 17:
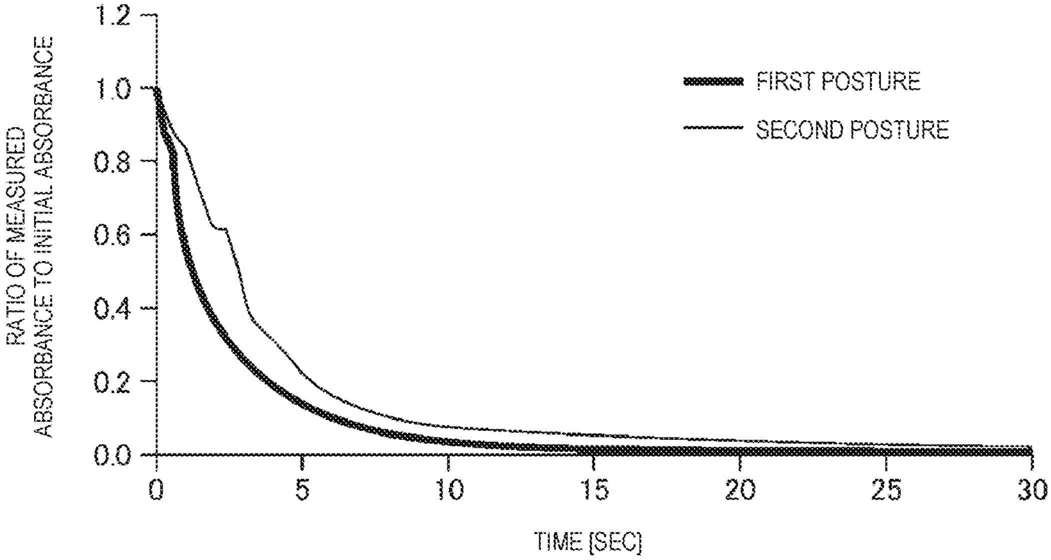
FIG. 17 is a graph showing transition of an absorbance of a magnetic bead dispersion liquid measured after changing a posture of the magnet.

FIG. 17 is a graph showing transition of an absorbance of a magnetic bead dispersion liquid measured after changing the posture of the magnet. In the graph shown in FIG. 17, a horizontal axis represents time, and a vertical axis represents a ratio of the measured absorbance to an initial absorbance.

As shown in FIG. 17, when the magnet is in a first posture, a rate at which the absorbance of the magnetic bead dispersion liquid decreases is larger than that in a case where the magnet is in a second posture. Accordingly, it is found that when a magnetic separation operation is performed, the magnetic separation speed can be increased by setting the magnet to the first posture.

7. Evaluation of Separation Efficiency

First, magnetic beads were charged into a container. Then, a weight of the container containing the magnetic beads was measured. The measured value is referred to as an "initial weight".

Next, pure water was charged into the container, and after stirring, a magnetic separation operation and a liquid discharge operation were performed. Thereafter, a weight of the container containing a stored substance was measured again. The measured value is referred to as a "weight after a separation operation".

Next, the initial weight was subtracted from the weight after the separation operation. The subtraction result corresponds to a weight of a liquid (residual liquid) remaining after adhering to the magnetic beads, and therefore, the weight is referred to as a "residual liquid weight".

Next, a volume f the residual liquid was calculated based on the residual liquid weight. The calculation result is referred to as a "residual liquid amount". Then, the measurement of the residual liquid amount was repeated by changing a posture of a magnet (direction of magnetization), and a graph was created based on a measurement result.

Figure 18:
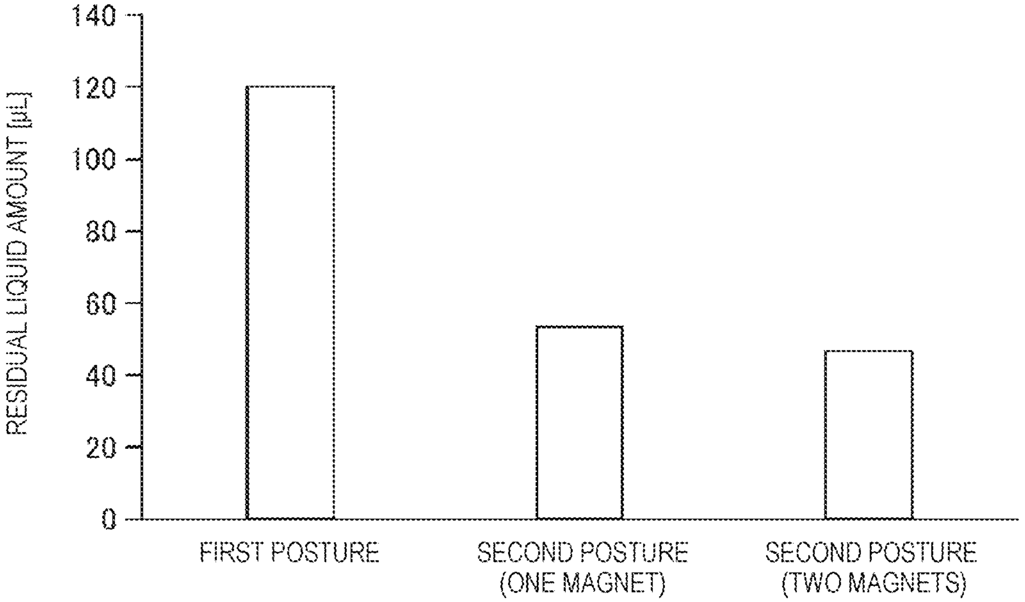
FIG. 18 is a graph comparing residual liquid amounts measured after changing the posture of the magnet.

FIG. 18 is a graph comparing residual liquid amounts measured after changing the posture of the magnet.

As shown in FIG. 18, when the magnet is in the second posture, the residual liquid amount is smaller than that in a case where the magnet is in the first posture. Even when two magnets are disposed close to each other in one container, when a posture of each magnet is the second posture, the residual liquid amount is small. Accordingly, it is found that, when the liquid discharge operation is performed, the residual liquid amount can be reduced, that is, the separation efficiency between the magnetic beads and the liquid can be improved by setting the magnet to the second posture.

8. Evaluation of Drying Speed

First, magnetic beads and pure water were charged into a container and stirred, and then a magnetic separation operation and a liquid discharge operation were performed.

Next, the container was placed in an environment of a temperature of 25° C. and a relative humidity of 50% while an opening of the container was open, and a weight change amount of the container containing a stored substance was measured. Then, the weight change amount when a posture of a magnet (direction of magnetization) was changed was measured, and a graph was created based on a measurement result. Transition of the weight change amount of the container containing the stored substance represents a drying speed of the liquid (residual liquid) remaining after adhering to the magnetic beads.

Figure 19:
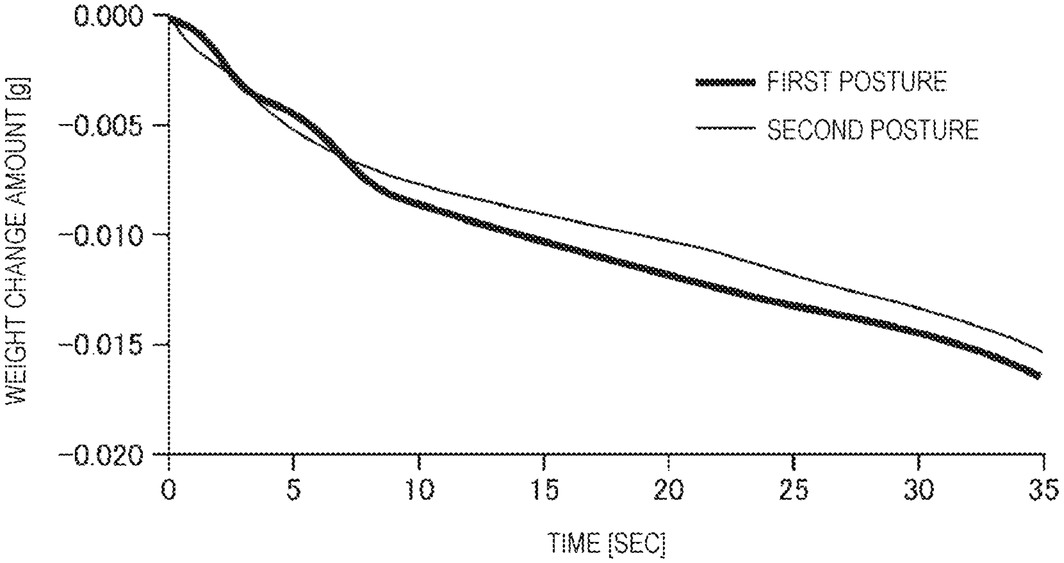
FIG. 19 is a graph showing transition of a weight change amount (drying speed) measured after changing the posture of the magnet.

FIG. 19 is a graph showing the transition of the weight change amount (drying speed) measured after changing the posture of the magnet. In the graph shown in FIG. 19, the horizontal axis represents time, and the vertical axis represents a weight change amount.

As shown in FIG. 19, when the magnet is in the first posture, a weight reduction amount is larger than that in a case where the magnet is in the second posture. It is considered that this is because when the magnet is in the first posture, a spike phenomenon occurs in the magnetic beads and a surface increases. That is, it is considered that the drying speed of the liquid held between the magnetic beads is increased by increasing the surface area.

From evaluation results as described above, it is confirmed that according to the present disclosure, it is possible to implement a magnetic separation device and a magnetic separation method excellent in both the magnetic separation speed and the separation efficiency between the magnetic beads and the liquid.

What is claimed is:

1. A magnetic separation device, comprising:

a plurality of magnets, each of the plurality of magnets being provided at a position adjacent to at least two of a plurality of tubular accommodation portions, each of the plurality of magnets extending along a first axis and having magnetization for applying a magnetic field to the adjacent two tubular accommodation portions;

a base configured to support the plurality of magnets; and a driver configured to change a posture of each of the plurality of magnets between a first posture and a second posture in synchronization with one another among the plurality of magnets, wherein the driver is configured with a single shaft, a plurality of rack gears, and a plurality of pinion gears to rotate each of the plurality of magnets around a rotation axis parallel to the first axis, the plurality of magnets are arranged in a matrix along a plurality of rows and a plurality of columns, a number of the plurality of rack gears are equal to a number of the plurality of rows, and a number of the plurality of magnets are equal to a number of the plurality of pinion gears, an end of each of the plurality of rack gears is connected to the single shaft such that, in the first posture, a direction of the magnetization faces a direction closer to a second axis than a third axis, and in the second posture, the direction of the magnetization faces a direction closer to the third axis than the second axis, the second axis is orthogonal to each of the first axis and the third axis, and the second axis and the third axis are in the same plane, the single shaft extends along the second axis and all the plurality of rack gears extend along the third axis, the magnetic separation device is configured to:

hold a mixture of magnetic beads and a liquid in each of the plurality of tubular accommodation portions;

perform a separation operation to separate the magnetic beads from the liquid in the first posture; and perform a discharge operation to discharge the liquid from each of the plurality of tubular accommodation portions in the second posture.

2. The magnetic separation device according to claim 1, wherein each magnet of the plurality of magnets has a columnar shape with the rotation axis as a central axis.

3. The magnetic separation device according to claim 1, wherein two magnets of the plurality of magnets are provided at positions opposite to each other via one tubular accommodation portion of the plurality of tubular accommodation portions.

4. The magnetic separation device according to claim 1, wherein when a well plate, in which the plurality of tubular accommodation portions accommodating the magnetic beads are arranged, overlaps the magnetic separation device, each magnet of the plurality of magnets is positioned between two adjacent tubular accommodation portions of the plurality of tubular accommodation portions.

5. The magnetic separation device according to claim 1, wherein each of the plurality of tubular accommodation portions is an insertion portion into which a container for accommodating the magnetic beads is inserted.

6. The magnetic separation device according to claim 1, further comprising:

a moving stage configured to move the base along the first axis.

7. A magnetic separation method of a magnetic separation device, the magnetic separation device including:

a plurality of magnets, each of the plurality of magnets being provided at a position adjacent to at least two of a plurality of tubular accommodation portions, each of the plurality of magnets extending along a first axis and having magnetization for applying a magnetic field to the adjacent two tubular accommodation portions;

a base configured to support the plurality of magnets; and a driver configured to change a posture of each of the plurality of magnets between a first posture and a second posture in synchronization with one another among the plurality of magnets, the magnetic separation method comprising:

a magnetic separation step of separating, by applying the magnetic field to the plurality of tubular accommodation portions for respectively accommodating magnetic beads and a liquid and by fixing the magnetic beads to an inner wall of each tubular accommodation portion of the plurality of tubular accommodation portions, the magnetic beads and the liquid; and a liquid discharge step of discharging the liquid in a state in which the magnetic beads and the liquid are separated, wherein an axis orthogonal to the first axis in a plane orthogonal to the first axis is a second axis, and an axis orthogonal to the second axis in the plane is a third axis, the driver is configured with a single shaft, a plurality of rack gears, and a plurality of pinion gears to rotate each of the plurality of magnets around a rotation axis parallel to the first axis, the plurality of magnets are arranged in a matrix along a plurality of rows and a plurality of columns, a number of the plurality of rack gears are equal to a number of the plurality of rows, and a number of the plurality of magnets are equal to a number of the plurality of pinion gears, and an end of each of the plurality of rack gears is connected to the single shaft such that, in the magnetic separation step, as the first posture, a direction of the magnetization faces a direction closer to a second axis than a third axis, and in the liquid discharge step, as the second posture, the direction of the magnetization faces a direction closer to the third axis than the second axis.

8. The magnetic separation method according to claim 7, further comprising:

a drying step of drying the magnetic beads separated from the liquid, wherein in the drying step, the magnetic field is applied at an angle closer to the second axis than the third axis.

9. The magnetic separation method according to claim 7, further comprising:

a magnetic bead dispersion step of dispersing the magnetic beads in the liquid, wherein in the magnetic separation step and the liquid discharge step, the magnetic field is applied to each tubular accommodation portion of the plurality of tubular accommodation portions by bringing the plurality of magnets adjacent to the plurality of tubular accommodation portions, respectively, and in the magnetic bead dispersion step, the application of the magnetic field to the plurality of tubular accommodation portions is released by moving the plurality of magnets away from the plurality of tubular accommodation portions, respectively.

* * * * *